(12) United States Patent
Nimura

(10) Patent No.: US 9,485,389 B2
(45) Date of Patent: Nov. 1, 2016

(54) PAGE IMAGE CORRECTION DEVICE, AND RECORDING MEDIUM

(71) Applicant: CASIO COMPUTER CO., LTD., Tokyo (JP)

(72) Inventor: Ryo Nimura, Tokyo (JP)

(73) Assignee: CASIO COMPUTER CO., LTD., Tokyo (JP)

(*) Notice: Subject to any disclaimer, the term of this patent is extended or adjusted under 35 U.S.C. 154(b) by 0 days.

(21) Appl. No.: 14/843,015

(22) Filed: Sep. 2, 2015

(65) Prior Publication Data

US 2016/0080606 A1 Mar. 17, 2016

(30) Foreign Application Priority Data

Sep. 12, 2014 (JP) .................................. 2014-186096

(51) Int. Cl.
*H04N 1/387* (2006.01)
*H04N 1/409* (2006.01)
*H04N 1/00* (2006.01)

(52) U.S. Cl.
CPC .......... *H04N 1/409* (2013.01); *H04N 1/00726* (2013.01); *H04N 1/387* (2013.01); *H04N 2201/0081* (2013.01)

(58) Field of Classification Search
None
See application file for complete search history.

(56) References Cited

U.S. PATENT DOCUMENTS

| 5,659,404 A * | 8/1997 | Matsuda ............... H04N 1/401 358/474 |
| 5,774,237 A * | 6/1998 | Nako .................... H04N 1/047 358/471 |
| 7,072,527 B1 * | 7/2006 | Nako ....................... G06K 9/32 358/474 |
| 7,079,265 B2 * | 7/2006 | Horie .................... H04N 1/047 358/1.12 |
| 7,418,126 B2 * | 8/2008 | Fujimoto .............. G06T 3/0031 382/154 |
| 7,639,406 B1 * | 12/2009 | Proudfoot ........ H04N 1/19594 358/464 |
| 8,554,012 B2 * | 10/2013 | Du .......................... G06K 9/32 382/112 |

FOREIGN PATENT DOCUMENTS

JP 2006-114993 A 4/2006

\* cited by examiner

*Primary Examiner* — Paul F Payer
(74) *Attorney, Agent, or Firm* — Chen Yoshimura LLP

(57) ABSTRACT

A page image correction device includes: an acquisition unit that acquires a page image of each page of a plurality of pages from a book, the book being successively imaged in a thickness direction thereof; and a processor configured to: derive, in accordance with a page image of a first prescribed page and a page image of a second prescribed page differing from the first prescribed page, an amount of change in a thickness of the book when the book is opened to the first prescribed page as compared to when the book is opened to the second prescribed page; and correct, in accordance with the amount of change in the thickness of the book, page images of pages between the first prescribed page and the second prescribed page.

18 Claims, 23 Drawing Sheets

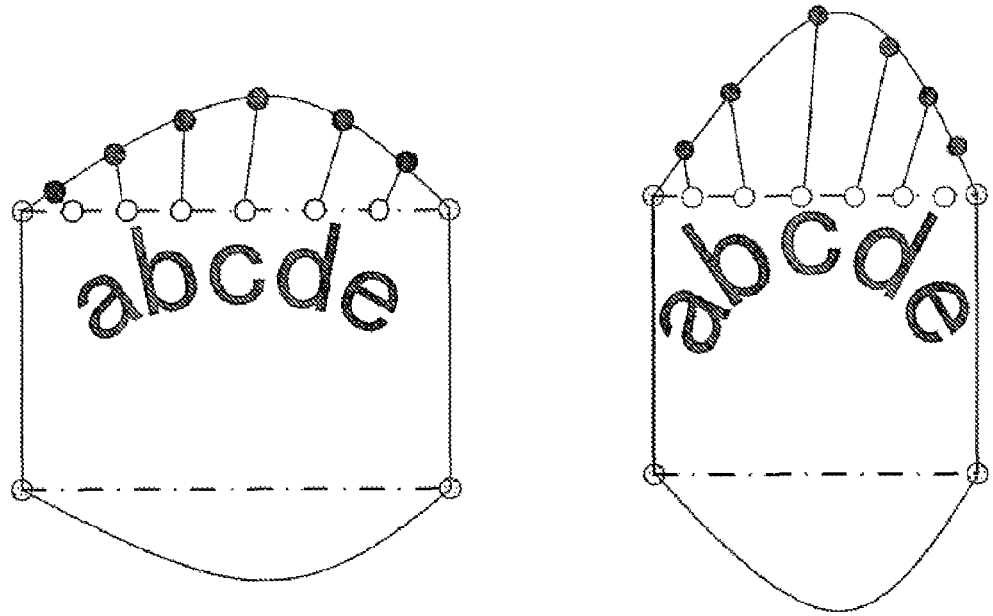
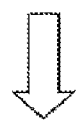
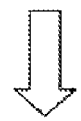
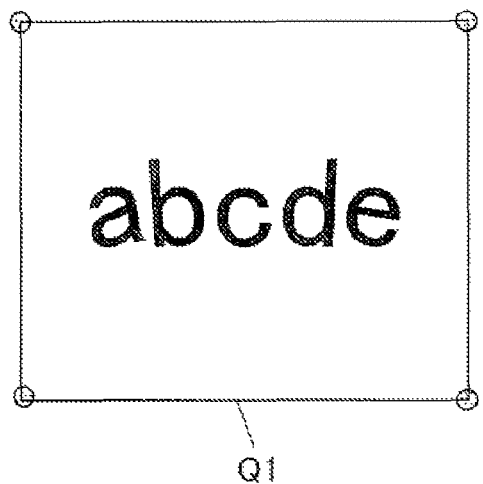
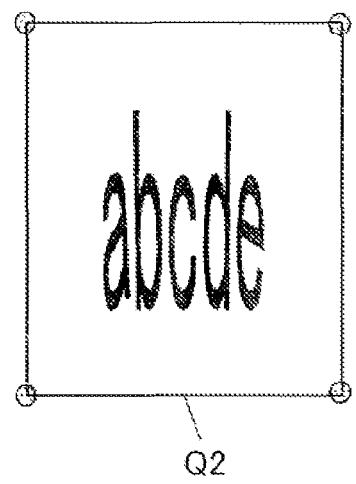
FIG. 20A    FIG. 20B

Arbitrary coordinates outside the image are added to the structure assuming that all outer points are connected to infinite points

PAGE IMAGE CORRECTION DEVICE, AND RECORDING MEDIUM

BACKGROUND OF THE INVENTION

1. Field of the Invention

The present invention relates to a page image correction device and a recording medium.

2. Description of Related Art

Conventionally, image reading devices have an imaging unit that is placed above an open book, and this imaging unit captures the pages of the book one-by-one as images, for example.

Japanese Patent Application Laid-Open Publication No. 2006-114993, for example, discloses an image reading device that can designate a manuscript size to extract only the necessary areas from the image that the imaging unit has captured.

During imaging by the image reading device, it is common for the pages of the book to curve, and for the extracted images to also show these curves, which makes the image hard to decipher.

SUMMARY OF THE INVENTION

Accordingly, the present invention is directed to a scheme that substantially obviates one or more of the above-discussed and other problems due to limitations and disadvantages of the related art.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a page image correction device, including: an acquisition unit that acquires a page image of each page of a plurality of pages from a book, the book being successively imaged in a thickness direction thereof; and a processor configured to: derive, in accordance with a page image of a first prescribed page and a page image of a second prescribed page differing from the first prescribed page, an amount of change in a thickness of the book when the book is opened to the first prescribed page as compared to when the book is opened to the second prescribed page; and correct, in accordance with the amount of change in the thickness of the book, page images of pages between the first prescribed page and the second prescribed page.

In another aspect, the present disclosure provides a page image correction device, including: a page image acquisition unit that acquires a page image of each page of a plurality of pages from a book; and a processor configured to, with respect to at least some of the plurality of pages from the book: receive data representing the page image; acquire a top reference line extending in a page width direction at a top of the page image, and a bottom reference line extending in the page width direction at a bottom of the page image from the received data representing the page image; determine four reference points on the page image based on the top reference line and the bottom reference line; correct quadrilateral distortions on the page image using the four reference points as references so that the reference points, after the correction, form a prescribed quadrilateral shape; virtually divide the page image, the quadrilateral distortions of which have been corrected, into an n-number of substantially rectangular divided regions, the substantially rectangular divided regions extending along a seam direction of the book between a quadrilateral distortion corrected top reference line and a quadrilateral distortion corrected bottom reference line and being arranged in a width direction that is perpendicular to the seam direction; correct a vertical length in the seam direction of each of the divided regions so that the vertical length of each of the divided regions becomes the same; estimate an amount of vertical deflection for each of the divided regions, the vertical length of which has been corrected; correct a horizontal length in the width direction of each of the divided regions on a basis of the amount of the vertical deflection that has been estimated; and combine the n-number of the divided regions, the vertical and horizontal lengths of which have been corrected, thereby creating data representing a combined and corrected page image.

In another aspect, the present disclosure provides a non-transitory computer-readable storage medium having stored therein a program executable by a processor that controls a page image correction device, the program causing the processor to perform the following: acquire a page image of each page of a plurality of pages from a book, the book being successively imaged in a thickness direction thereof; derive, in accordance with a page image of a first prescribed page and a page image of a second prescribed page differing from the first page, an amount of change in a thickness of the book when the book is opened to the first prescribed page as compared to when the book is opened to the second prescribed page; and correct, in accordance with the amount of change in the thickness of the book, page images of pages between the first prescribed page and the second prescribed page.

It is to be understood that both the foregoing general description and the following detailed description are exemplary and explanatory, and are intended to provide further explanation of the invention as claimed.

A deeper understanding of the present invention can be obtained by referring to the drawings described below alongside the detailed descriptions given later.

BRIEF DESCRIPTION OF THE DRAWINGS

FIGS. 20A and 20B show examples of corrected images that differ depending on the degree to which the page was wrinkled.

DETAILED DESCRIPTION OF EMBODIMENTS

Figure 1:
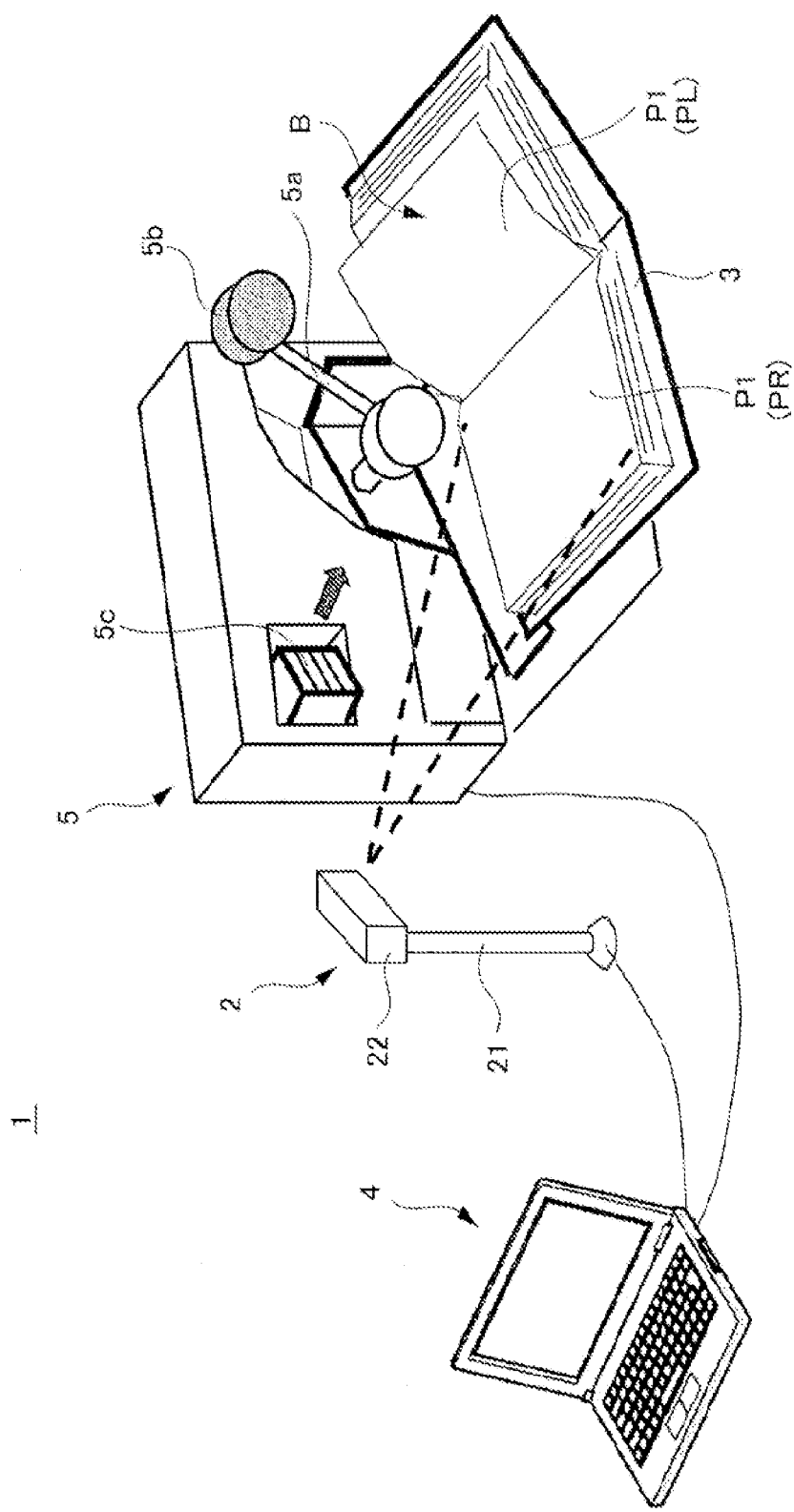
FIG. 1 is a perspective view of a schematic configuration of a document camera system according to Embodiment 1.

Aspects embodying the present invention (hereinafter, "embodiments") will be explained in detail below with reference to the attached drawings. In the explanations of the embodiments, the same elements throughout are given the same reference characters.

Embodiment 1

FIG. 1 is a perspective view of a schematic configuration of a document camera system, which is a page image correction device according to Embodiment 1 of the present invention.

As shown in FIG. 1, the document camera system 1 includes a document camera 2, which is an imaging unit that images a page P1 of a book B, a table 3 on which the book B is placed, a computer 4 connected to the document camera 2 so as to communicate therewith, and an automatic page turner 5 that automatically turns the page P1 of the book B. The book B in the present invention includes ordinary books, bound documents, and the like.

The document camera 2 has a stand part 21, and a camera 22 attached to the top of the stand part 21.

The stand part 21 can tilt freely in the front-back and left-right direction and can vertically extend/contract, such that it is possible to adjust the positional relationship of the camera 22 relative to the book B.

The junction of the camera 22 and the stand part 21 has a position adjusting mechanism, which makes it possible to also adjust the orientation of the camera 22 lens.

The camera 22 is disposed in a location where it is possible to obtain an image of a right page PR of the open book B on the table 3 in one imaging.

The automatic page turner 5 includes an arm 5a that can freely revolve in the direction in which the pages are turned, a page turning part 5b provided on the tip of the arm 5a, and a vent 5c that blows air.

The arm 5a is capable of rotating through a motor (not shown) in order to turn the pages.

The page turning part 5b is attached to the arm 5a such that the page turning part 5b can rotate. The surface of the page turning part 5b has adhesive characteristics.

When the motor drives the arm 5a such that the page turning part 5b contacts the right page PR, the page turning part 5b holds the right page PR with the adhesive strength thereof.

Thereafter, when the motor drives the arm 5a towards the left page PL so as to flip the right page PR, the right page PR adhered to the page turning part 5b moves to the left page PL along with the page turning part 5b.

The vent 5c blows air in order to separate the right page PR adhered to the page turning part 5b from the page turning part 5b; therefore, the right page PR that is adhered to the page turning part 5b is pressed onto the left page PL by this wind power.

The page turning unit 5b is attached to the arm 5a so as to be rotatable. Thus, it is possible to turn the pages by the page turning part 5b rotating such that the right page PR slides thereto, and by the right page PR being removed from the page turning unit 5b so as to overlap the left page PL.

Next, the primary control configuration of the document camera system 1 of Embodiment 1 will be explained.

Figure 2:
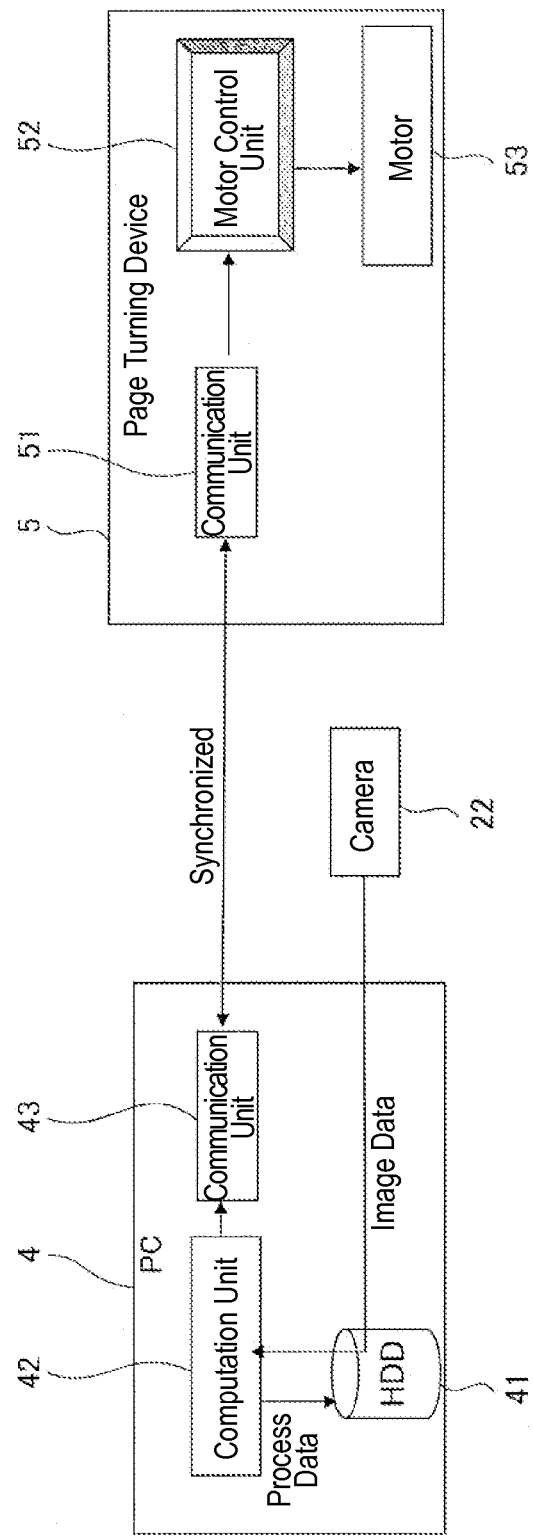
FIG. 2 is a block view of the primary control configuration of the document camera system according to Embodiment 1.

FIG. 2 is a block view of the primary control configuration of the document camera system 1.

The computer 4 includes a storage unit (HDD) 41, a computation unit 42, and a communication unit 43.

The storage unit (HDD) 41 stores page images that have been taken, corrected images, and the like.

The computation unit 42 includes a ROM (not shown) in which various types of programs are recorded, such as a program for automatically capturing a page image by controlling the automatic page turner 5 and the camera 22 (hereinafter, also referred to as "automatic imaging program"), and a program for correcting the page image that was taken (hereinafter, also referred to as "image processing program"). The computation unit 42 further includes a RAM (not shown) in which these programs are extracted during execution of the programs in the ROM, and a CPU (not shown) for extracting and executing the programs in the ROM in the RAM.

The communication unit 43 performs synchronous communication with the automatic page turner 5.

Although not shown in FIG. 2, the computer 4 also includes operational members such as a keyboard, touch panel, mouse, a display member such as a liquid crystal monitor, and the like.

The automatic page turner 5 includes a communication unit 51, a motor control unit 52, and a motor 53.

The communication unit 51 performs synchronous communication with the communication unit 43 in the computer 4.

The motor control unit 52 controls the motor 53 in accordance with page turning commands from the computation unit 42 in the computer 4.

The motor 53 rotates the arm 5a in order to turn the page P1 of the book B in accordance with the order from the motor control unit 52.

A method of reading an image with the document camera system 1 will be explained hereafter.

First, the user sets the book B on the table 3 with the book B opened to the first page P1.

After the book B has been set, the user operates the computer 4 through the operation members to cause the computer 4 to execute the automatic imaging program.

When the automatic imaging program is executed, the computation unit 42 in the computer 4 sends an imaging order to the camera 22, and an image of the first right page PR is taken. The page image that has been taken is stored in the storage unit (HDD) 41.

After the first imaging is finished, the computation unit 42 issues an order via the communication unit 43 to the automatic page turner 5 to turn the page.

When the order to turn the page is received, the motor control unit 52 drives the motor 53 such that the automatic page turner 5 executes the page turning operation as described above.

When the page turning operation is finished, the automatic page turner 5 transmits an operation complete signal indicating the completion of the page turning operation to the computer 4 via the communication unit 51.

When the computer 4 receives the operation complete signal, the computer 4 again issues an imaging order to the camera 22, and the second right page PR is imaged.

This operation is repeated until all right pages PR have been imaged.

When imaging of the right pages PR has ended, the user sets the book B on the table 3 such that the letters in the book B now face the opposite direction.

In other words, the user places the book B on the table 3 such that left pages PL of the book B are now located where the right pages PR were previously, and then opens to the first page.

Note that the left pages PR are set upside down, and thus the last page of the book is the first to be opened.

After the book B has been set on the table 3, the operation members of the computer 4 are used to cause the automatic imaging program to run and image the left pages PL, in a manner similar to before.

In this manner, after all left- and right-pages have been imaged, the user then uses the operation members of the computer 4 to cause the image processing program to run.

The page images that have been captured have spots where the size of the letters, image, or the like seem enlarged or spots where these seem contracted, due to the pages curving in the opening direction of the book, the distance of the position of each page differing from the camera 22, and the like. The image processing aims to correct page images that have been distorted in this manner so that there are no distortions in the page image.

The image processing of the image processing program is divided into a left page PL image group and a right page PR image group. The processing details of the left page image group and the right page image group are the same, and thus, the details of the image processing will be explained below using the left page image group as representative.

Figure 3:
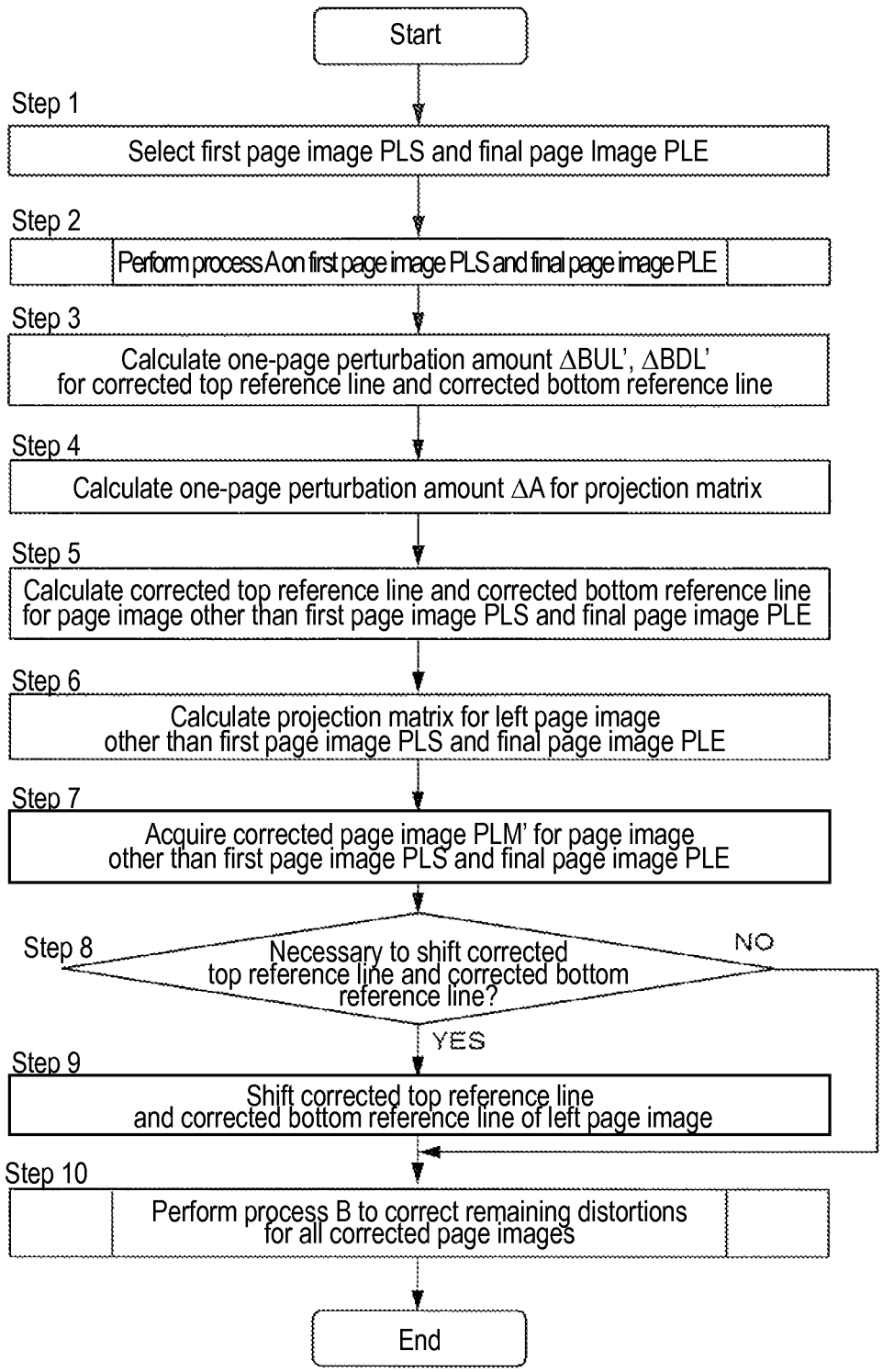
FIG. 3 is a flow chart of an imaging process according to Embodiment 1.

FIG. 3 is a flow chart of the image processing.

The computation unit 42 in the computer 4 (hereinafter, "computation unit 42") selects a first page image PLS and a final page image PLE from the left page image group captured beforehand (step 1), runs process A on the selected first page image PLS and final page image PLE (step 2), and thereby obtains base data that will serve as a reference for image correction.

(FIG. 3: step 2 (process A in FIG. 4))

Process A will be explained below with reference to the flow chart of process A in FIG. 4.

Figure 4:
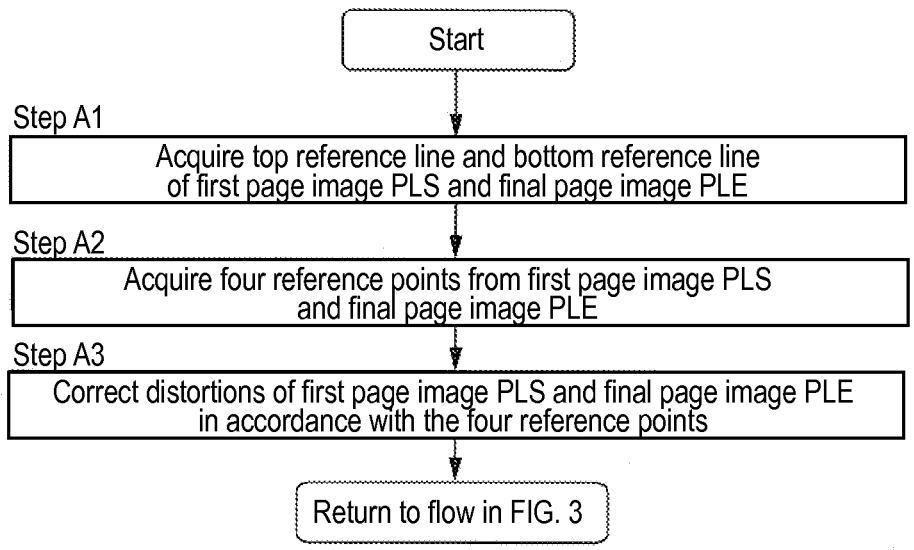
FIG. 4 is a flow chart of process A according to Embodiment 1.

(FIG. 4: step A1)

First, the computation unit 42 obtains a top reference line and a bottom reference line from both the first page image PLS and the final page image PLE (step A1).

The top reference line and the bottom reference line are lines that, when the corresponding page of the book B is flat, extend perfectly straight across the horizontal direction of the page.

In other words, these lines should be completely straight after the image processing has finished.

These lines that should be completely straight are curved in the first page image PLS and the final page image PLE due to the page image itself being distorted, and this process obtains these curved lines (also referred to as reference curves).

The top reference line is the reference curve located at the top of the page image, and the bottom reference line is the reference curve located at the bottom of the page image.

It should be noted that, when obtaining the top reference lines of the first page image PLS and the final page image PLE, the lines to be obtained have the same position in the same vertical direction on the corresponding pages of the book B.

Furthermore, the bottom reference lines of the first page image PLS and the final page image PLE, in a manner similar to the top reference lines, have the same position in the same vertical direction on the corresponding pages of the book B.

Specifically, the process for obtaining the top reference lines and the bottom reference lines will be explained below with reference to FIGS. 5 and 6.

Figure 5:
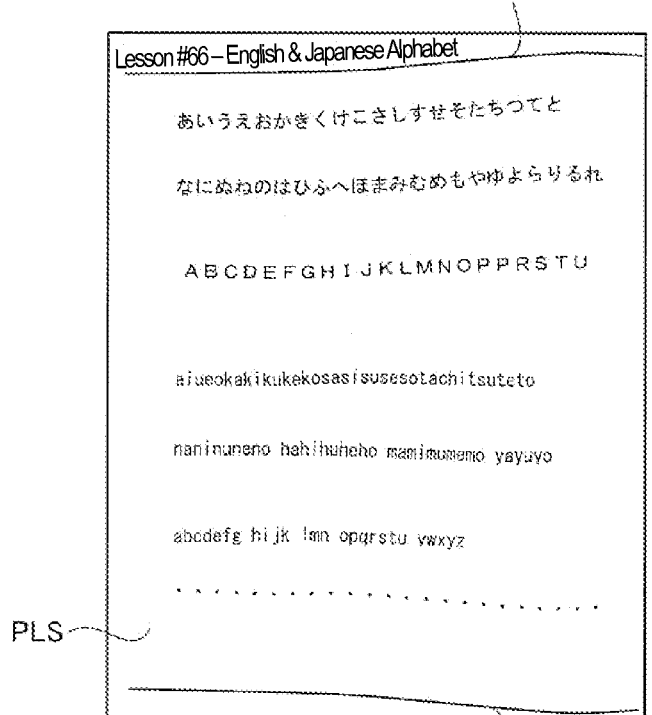
FIG. 5 is a view for explaining reference curves according to Embodiment 1.

FIG. 5 shows a curved line that is the top reference line positioned at the top of the book B, and a curved line that is the bottom reference line positioned at the bottom of the book B.

If the pages of the book B were completely flat, these lines would be perfectly straight, and if these types of perfectly straight lines are already present in the book B, then these may be used as the top reference line and the bottom reference line.

Figure 6:
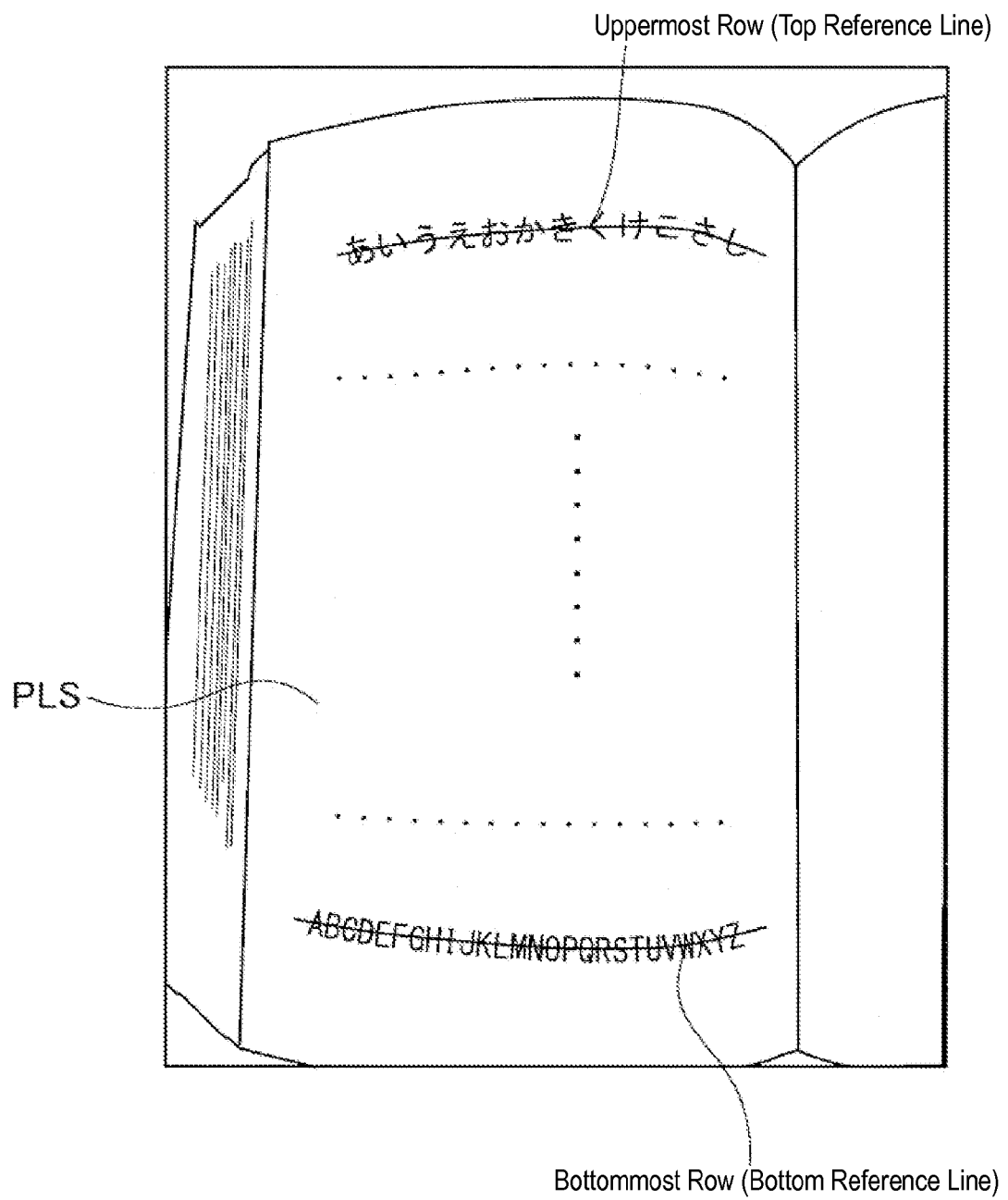
FIG. 6 is a view for explaining other reference curves according to Embodiment 1.

If there are no lines in the book B that can be the top reference line and the bottom reference line, as in FIG. 5, then the top row of the book B may be the top reference line, and the bottom row may be the bottom reference line, as shown in FIG. 6.

Note that the top reference line and the bottom reference line may be obtained automatically, and if there is a page image in which identifying reference lines is difficult, the user may use the operation members (mouse or the like) of the computer 4 to assign the reference lines.

The top reference line and the bottom reference line are obtained as straight lines that are connected by dots as expressed by point coordinates for a later process.

If the width of the reference curves attempting to be made the top reference line and the bottom reference line cannot be sufficiently obtained as point coordinates, then a process may be performed to obtain these point coordinates, for example.

The specific method of obtaining the reference curves will be explained after this description of the image processing is finished.

Moreover, when using the rows in the book B as the reference curves, as shown in FIG. 6, the reference curves do not reach both ends in the horizontal direction of the book B. In this case, the top reference line and the bottom reference line, which were obtained as point coordinates, are extended in the horizontal direction, and the curved lines that have been thus extended serve as the top reference line and the bottom reference line.

Figure 7:
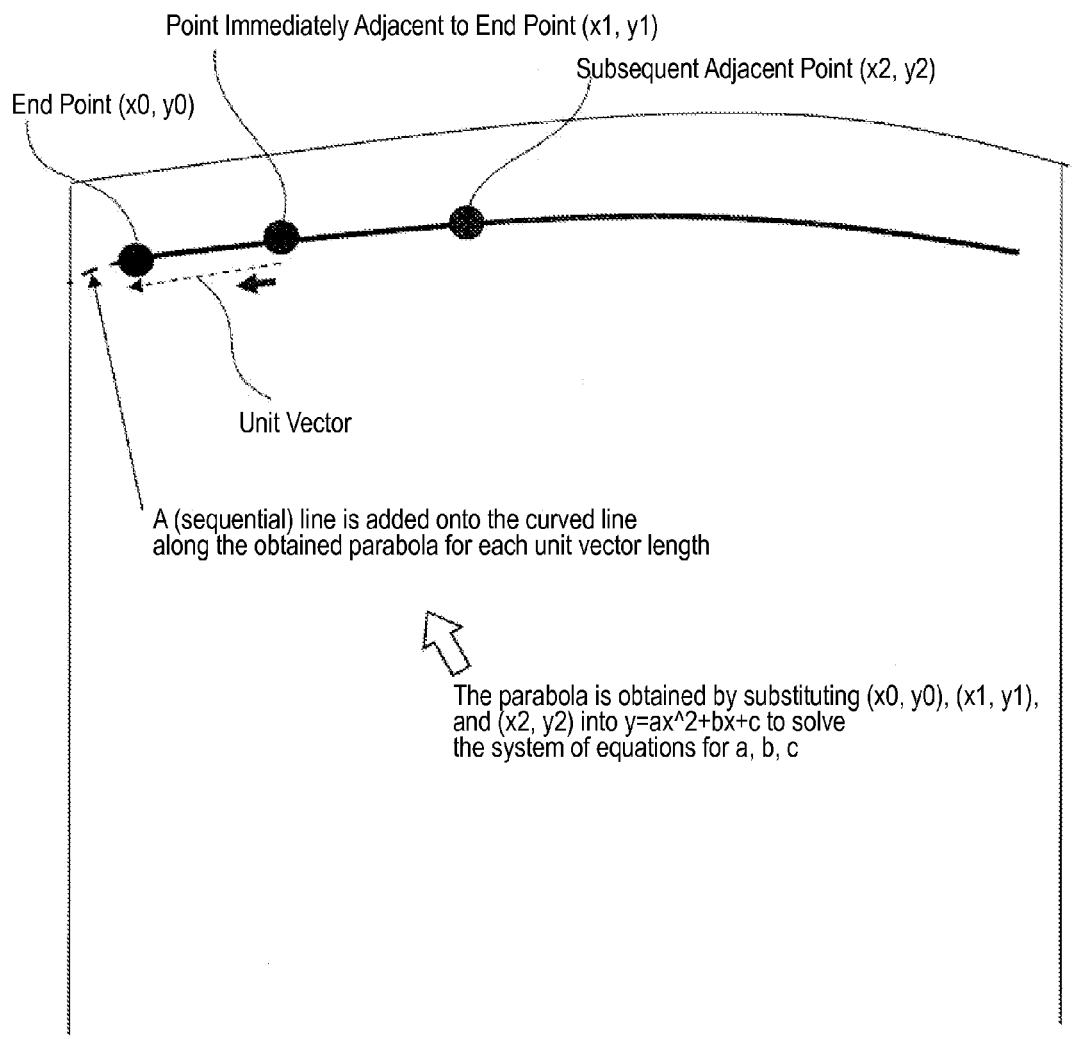
FIG. 7 is a view for explaining how to extend the reference curves according to Embodiment 1.

As shown in FIG. 7, a parabolic equation is found using three points continuing from the edge of the page, and a (sequential) line is added for each unit vector length along the obtained parabola, with the edge being extended as necessary, for example.

Figure 8:
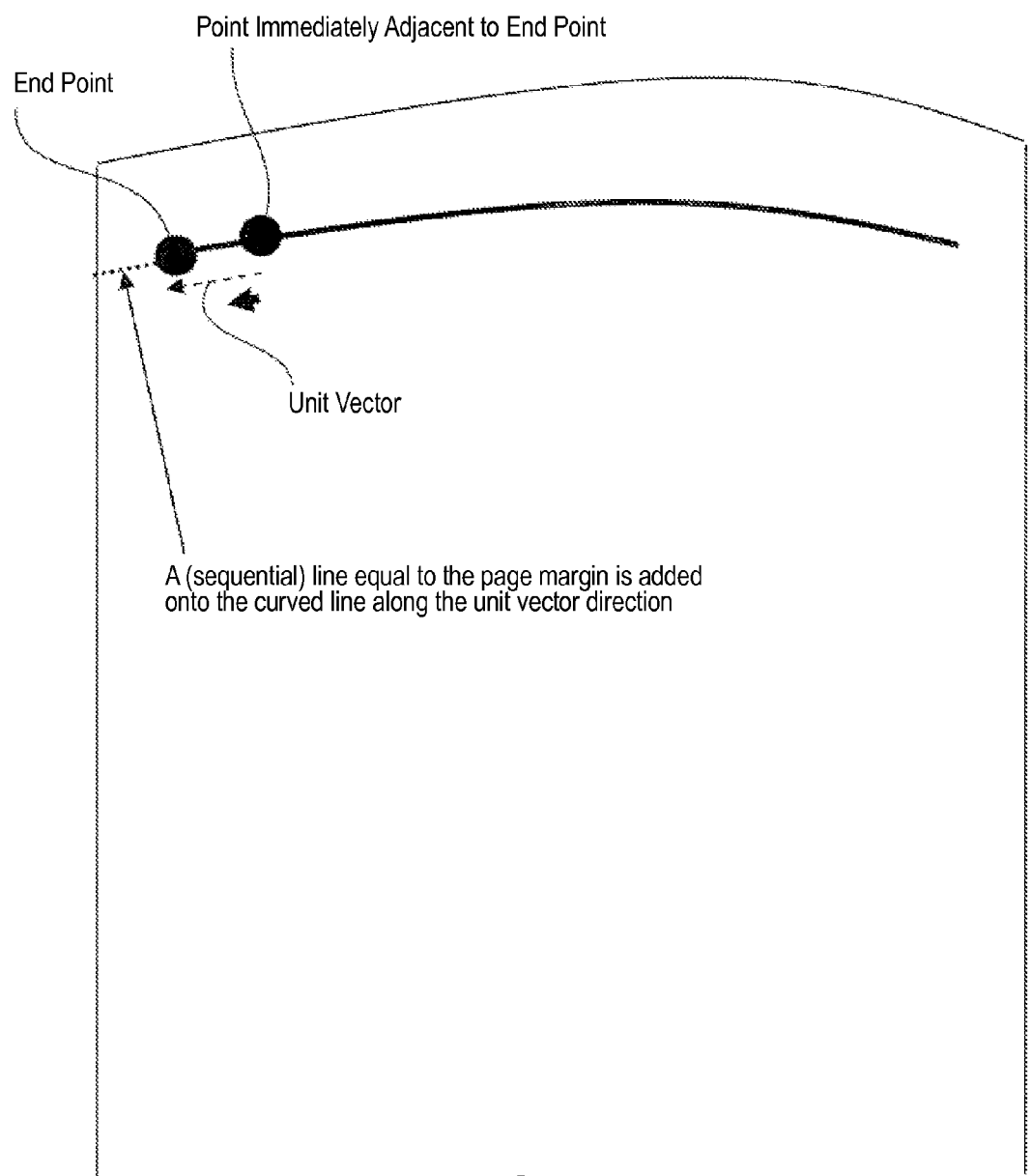
FIG. 8 is a view for explaining how to extend the other reference curves according to Embodiment 1.

In a separate method, as shown in FIG. 8, a (sequential) line is added as necessary in the unit vector direction based on a point on the edge of the page and a point adjacent thereto, thereby extending the edge as necessary.

FIGS. 7 and 8 only show the left edge, but the right edge is also extended as necessary, in a manner similar to above.

As described above, the computation unit 42 obtains a top reference line SBUL and a bottom reference line SBDL from the first page image PLS, and a top reference line EBUL and a bottom reference line EBDL from the final page image PLE.

The computation unit 42 forms part of a reference line obtaining unit.

The explanation will be continued while returning to FIG. 4.

(FIG. 4: step A2)

Next, the computation unit 42 obtains four reference points each from the first page image PLS and the final page image PLE in accordance with the top reference lines and the bottom reference lines (step A2).

Specifically, points at both ends of the top reference line SBUL in the first page image PLS are two reference points, and points at both ends of the bottom reference line SBDL in the first page image PLS are two reference points, for a total of four obtained reference points.

Furthermore, in a similar manner for the final page image PLE, points at both ends of the top reference line EBUL in the final page image PLE are two reference points, and points at both ends of the bottom reference line EBDL in the final page image PLE are two reference points, for a total of four obtained reference points.

The computation unit 42 forms part of a reference point obtaining unit.

(FIG. 4: step A3)

Next, the computation unit 42 performs distortion correction of the first page image PLS and the final page image PLE in accordance with the four reference points (step A3).

Using the first page image PLS to describe this process, the four reference points of the first page image PLS found in step A2 are four points respectively located on the edges of the top reference line SBUL and the bottom reference line SBDL in the first page image PLS.

The top reference line SBUL and the bottom reference line SBDL in the first page image PLS are curved lines in the first page image PLS, but these two lines would normally be perfectly straight lines at the top and bottom of the corresponding page if the book were flat.

Accordingly, the four points respectively located at the edges of the top reference line SBUL and the bottom reference line SBDL in the first page image PLS would be located at the four corners of a quadrilateral shape (a rectangular shape such as a square or oblong, for example) were the corresponding page of the book B to be flat.

The first page image PLS, however, has distortions imparted during imaging; thus, even if the four reference points found in step A2 were to form perfectly straight lines, the result would not be a quadrilateral shape (rectangular shape), but rather a geometric shape such as a trapezoid or diamond.

As a countermeasure, a projection matrix is found and used to correct all distortions of the first page image PLS. This projection matrix has four target points, which is where the four reference points should be respectively located after distortion correction. In other words, the four target points are where the four reference points should normally be located.

In other words, the computation unit 42 computes a projection matrix SA in which the four reference points of the first page image PLS are projected onto the four prescribed target points that should be the corners of a perfectly quadrilateral shape (rectangular shape) after distortion correction. The computation unit 42 uses this projection matrix SA to perform distortion correction on the entire first page image PLS.

In a similar manner, the computation unit 42 computes a projection matrix EA in which the four reference points of the final page image PLE are projected onto the four prescribed target points that should be the corners of a perfectly quadrilateral shape (rectangular shape) after distortion correction. The computation unit 42 uses this projection matrix EA to perform distortion correction on the entire final page image PLE.

This distortion correction also projects the point coordinates of the top reference line SBUL and the bottom reference line SBDL of the first page image PLS; therefore, a post-distortion correction top reference line SBUL' and a post-distortion correction bottom reference line SBDL' defined by the point coordinates after projection will be referred to as the corrected top reference line SBUL' and the corrected bottom reference line SBDL'.

In a similar manner for the final page image PLE, a post-distortion correction top reference line EBUL' and a post-distortion correction bottom reference line EBDL' will be referred to as the corrected top reference line EBUL' and the corrected bottom reference line EBDL'.

Furthermore, a post-distortion correction first page image PLS' and a post-distortion correction final page image PLE' will be referred to as the corrected first page image PLS' and the corrected final page image PLE'.

The computation unit 42 forms a part of a distortion correction unit.

It should be noted that the corrected first page image PLS' of the page image PLS, projection matrix SA, corrected top reference line SBUL', and corrected bottom reference line SBDL' found by the computation unit 42 in step A3 are stored in the storage unit (HDD) 41 of the computer 4 or the RAM of the computation unit 42.

Moreover, in a similar manner, the corrected final page image PLE' of the final page image PLE, projection matrix EA, corrected top reference line EBUL', and corrected bottom reference line EBDL' found by the computation unit 42 in step A3 are stored in the storage unit (HDD) 41 of the computer 4 or the RAM of the computation unit 42.

After step A3 is finished, the flowchart in FIG. 3 is returned to again.

Before explaining the next step in the flowchart in FIG. 3, a brief description of how steps A1 to A3, or namely, process A, modifies the first page image PLS and the final page image PLE and the result thereof will be given with reference to FIGS. 9 and 10. The first page image PLS will be used as representative for the explanation below.

Figure 9:
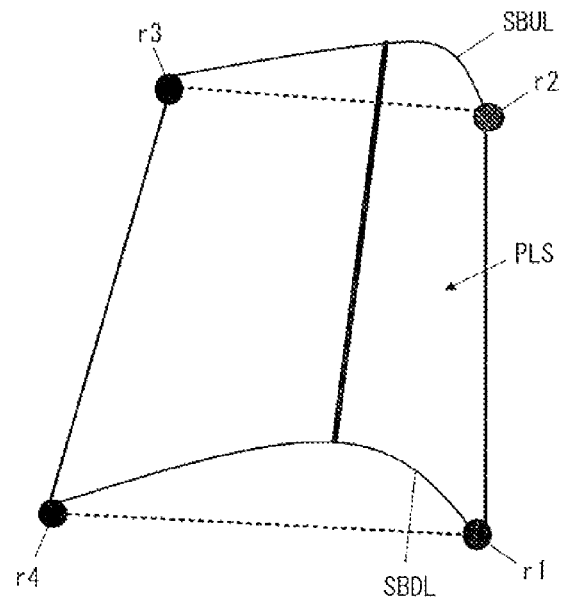
FIG. 9 is a view of a pre-projection page image according to Embodiment 1.

FIG. 9 shows the first page image PLS before distortion correction is performed.

FIG. 9 schematically shows only the portion of the first page image PLS between the top reference line SBUL and the bottom reference line SBDL.

As shown in FIG. 9, a trapezoid is formed when points r2 and r3 at both ends of the top reference line SBUL in the first page image PLS are respectively connected by perfectly straight lines to the points r1 and r4 on both ends of the bottom reference line SBDL.

Figure 10:
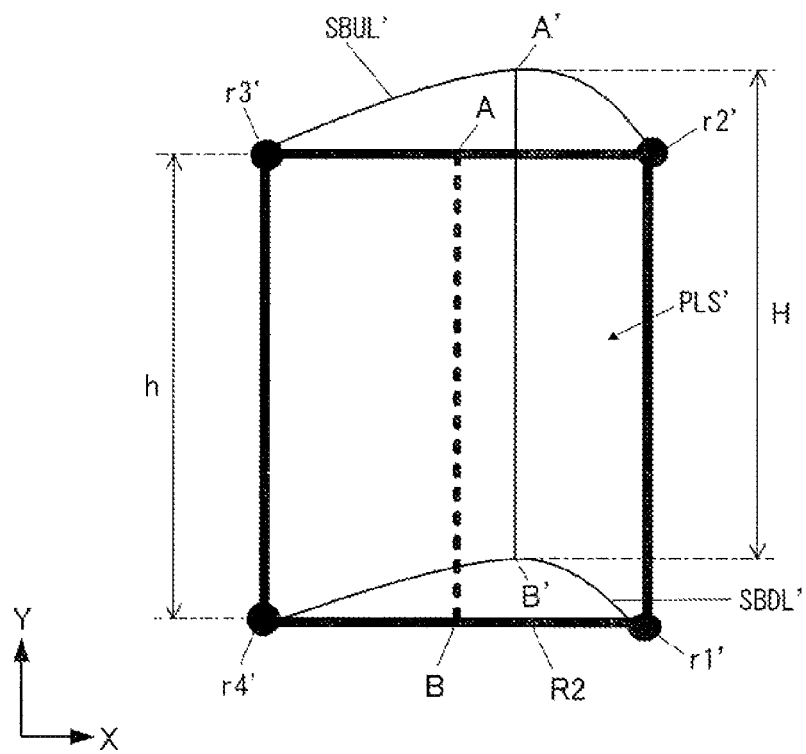
FIG. 10 is a view of a post-projection page image according to Embodiment 1.

FIG. 10 shows the corrected first page image PLS', which is the first page image PLS that has undergone distortion correction with the projection matrix SA.

In FIG. 10, for ease of viewing, a frontal view is shown of a quadrilateral formed by four target points r1', r2', r3', and r4' being respectively connected by perfectly straight lines.

The projection matrix SA is the four reference points projected onto the four target points, and the four reference points were the respective points at the ends of the top reference line SBUL and the bottom reference line SBDL in the first page image PLS. Therefore, the points at both ends of the corrected top reference line SBUL' and the corrected bottom reference line SBDL' in the corrected first page image PLS' projected by this projection matrix SA coincide with the four target points r1', r2', r3', and r4', as shown in FIG. 10.

Furthermore, the four target points are given as the points at the corners of a perfect quadrilateral in its original shape; thus, as shown in FIG. 10, the shape formed by respectively connecting the four target points r1', r2', r3', and r4' with perfectly straight lines is changed from the trapezoid in FIG. 9 to the quadrilateral (rectangular) shape.

As can be seen in FIG. 10, however, the corrected first page image PLS' is still not entirely a perfect quadrilateral shape, and the distortions have not been completely removed.

Accordingly, additional processes to correct the remaining distortions in the corrected first page image PLS' and the corrected final page image PLE' are necessary, which will be explained while returning to the flowchart in FIG. 3.

In the description above, however, processing is only performed for the first page image PLS and the final page image PLE.

It is necessary to perform similar processes for all other left page images in order remove the distortions from all of these pages.

If the above processes are applied to all left pages, however, the number of computations would become high, thereby slowing down the processing.

As a countermeasure, a process is performed to find the necessary data (projection matrix, corrected top reference line, corrected bottom reference line) to correct the other left pages between the first page image and the final page image with the data already obtained up to this point.

As shown in FIG. 1, the left pages are automatically turned, and each time a page is turned, the camera 22 takes a picture and obtains the page image.

At this time, the book B and the like are not being moved, so the continuous change from page to page is mainly a linear change following a sequential reduction in the number of left pages due to the page turning.

Thus, the projection matrix SA of the first left page image PLS changes in a linear fashion at a constant perturbation amount ΔA, leading to the projection matrix EA of the final left page image PLE.

In a similar manner for the corrected top reference line and the corrected bottom reference line, the corrected top reference line SBUL' and the corrected bottom reference line SBDL' in the corrected first page image PLS' of the left first page image PLS change at a constant perturbation amount, leading to the corrected top reference line EBUL' and the corrected bottom reference line EBDL' in the final left page image PLE.

In practice, the results from several tests support this.

Accordingly, the necessary data (projection matrix, corrected top reference line, corrected bottom reference line) for the page images between the first page image PLS and the final page image PLE are calculated with focus on this linearity.

(FIG. 3: step 3)

Therefore, in step 3 shown in the flowchart in FIG. 3, first a one-page perturbation amount ΔBUL' of the corrected top reference line SBUL' and a one-page perturbation amount ΔBDL' of the corrected bottom reference line SBDL' are found in accordance with the corrected top reference line SBUL' and the corrected bottom reference line SBDL' from the first page image PLS and the corrected top reference line EBUL' and the corrected bottom reference line EBDL' from the final page image PLE.

Specifically, in order to find the total amount of change TUL', the computation unit 42 uses the difference in coordinates between the corrected top reference line EBUL' of the final page image PLE, which has a high page number, and the corrected top reference line SBUL' of the first page image PLS, which has a low page number (see formula (2)).

$$TUL' = EBUL' \text{ coordinates} - SBUL' \text{ coordinates} \quad (2)$$

The computation unit 42 finds the one-page perturbation amount ΔBUL' for the corrected top reference line by dividing this total amount of change TUL' by a number that is the number X of left pages between the first page image PLS and the final page image PLE plus 1 (X+1) (see formula (3)).

$$\Delta BUL' = TUL'/(X+1) \quad (3)$$

In a similar manner, in order to find a total amount of change TDL', the computation unit 42 uses the difference in coordinates between the corrected bottom reference line EBDL' of the final page image PLE, which has a high page number, and the corrected bottom reference line SBDL' of the first page image PLS, which has a low page number (see formula (4)).

$$TDL' = EBDL' \text{ coordinates} - SBDL' \text{ coordinates} \quad (4)$$

The computation unit 42 finds the one-page perturbation amount ΔBDL' for the corrected bottom reference line by dividing this total amount of change TDL' by a number that is the number X of left pages between the first page image PLS and the final page image PLE plus 1 (X+1) (see formula (5)).

$$\Delta BDL' = TDL'/(X+1) \quad (5)$$

The total amount of change TUL' of the corrected top reference line, the one-page perturbation amount ΔBUL' of the corrected top reference line, the total amount of change TDL' of the corrected bottom reference line, and the one-page perturbation amount ΔBDL' of the corrected bottom reference line found by the computation unit 42 in step 3 are stored in the storage unit (HDD) 41 of the computer 4 or the RAM of the computation unit 42.

(FIG. 3: step 4)

Next, a one-page perturbation amount ΔA of the projection matrix is found in accordance with the matrix projection SA of the first page image PLS and the matrix projection EA of the final page image PLE (step 4).

Specifically, the computation unit 42 finds a total amount of change TA using the difference between the projection matrix SA of the first page image PLS, which has a low page number and the projection matrix EA of the final page image PLE, which has a high page number (see formula (6)).

$$TA = EA - SA \tag{6}$$

The computation unit 42 finds the one-page perturbation amount ΔA of the projection matrix by multiplying this total amount of change TA with a number that is the number X of left pages between the first page image PLS and the final page image PLE with 1 added thereto (X+1) (see formula (7)).

$$\Delta A = TA \times [1/(X+1)] \tag{7}$$

The total amount of change TA of the projection matrix and the one-page perturbation amount ΔA for the projection matrix found by the computation unit 42 in step 4 are stored in the storage unit (HDD) 41 of the computer 4 or the RAM of the computation unit 42.

(FIG. 3: step 5)

Next, a corrected top reference line MBUL' and a corrected bottom reference line MBDL' of a middle page image PLM between the first page image PLS and the final page image PLE will be found (step 5).

Calculating the corrected top reference line MBUL' involves the same process as calculating the corrected bottom reference line MBDL', with only the data used being different; therefore, a process in which the corrected top reference line MBUL' is sought will be explained.

The first page image PLS, which has a low page number, serves as the reference page, and Y is the number of pages from the reference page to the page image PLM that is between the first page image PLS and the final page image PLE in trying to find the corrected top reference line MBUL'.

This corrected top reference line MBUL' is equal to a value whereby the corrected top reference line SBUL' of the first page image PLS has been perturbed from the aforementioned linearity by Y (Y amount of times) at the one-page perturbation amount ΔBUL' of the corrected top reference line.

Therefore, the computation unit 42 finds the corrected top reference line MBUL' of the middle page image PLM that is between the first page image PLS and the final page image PLE in accordance with formula (8) below:

$$MBUL' = SBUL' + \Delta BUL' \times Y \tag{8}$$

In a similar manner, the computation unit 42 finds the corrected bottom reference line MBDL' of the middle page image PLM between the first page image PLS and the final page image PLE in accordance with formula (9) below:

$$MBDL' = SBDL' + \Delta BDL' \times Y \tag{9}$$

It should be noted that the corrected top reference line MBUL' of the middle page image PLM between the first page image PLS and the final page image PLE and the corrected bottom reference line MBDL' of the middle page image PLM between the first page image PLS and the final page image PLE found by the computation unit 42 in step 5 are stored in either the storage unit (HDD) 41 of the computer 4 or the RAM of the computation unit 42.

(FIG. 3: step 6)

Next, a projection matrix MA of the middle page image PLM between the first page image PLS and the final page image PLE will be found (step 6).

The first page image PLS, which has a low page number, serves as the reference page, and Y is the number of pages from the reference page to the page image PLM that is between the first page image PLS and the final page image PLE in trying to find the projection matrix MA.

This projection matrix MA is equal to a value whereby the projection matrix SA of the first page image PLS has been perturbed from the aforementioned linearity by Y (Y amount of times) at the one-page perturbation amount ΔA of the projection matrix.

Therefore, the computation unit 42 finds the projection matrix MA of the middle page image PLM between the first page image PLS and the final page image PLE in accordance with formula (10) below:

$$MA = SA + \Delta A \times X \tag{10}$$

It should be noted that the projection matrix MA of the middle page image PLM between the first page image PLS and the final page image PLE found by the computation unit 42 in step 6 is stored in either the storage unit (HDD) 41 of the computer 4 or the RAM of the computation unit 42.

(FIG. 3: step 7)

Due to the projection matrix MA of the middle page image PLM between the first page image PLS and the final page image PLE being found in step 6, the computation unit 42 projects the entire middle page image PLM using this projection matrix MA with respect to the middle page image PLM between the first page image PLS and the final page image PLE. The computation unit 42 thereby finds a corrected middle page image PLM' of the middle page image PLM between the first page image PLS and the final page image PLE.

It should be noted that the corrected middle page image PLM' of the middle page image PLM found by the computation unit 42 in step 7 is stored in either the storage unit (HDD) 41 of the computer 4 or the RAM of the computation unit 42.

(FIG. 3: step 8)

Next, it is determined whether there is a need to shift the corrected top reference line and the corrected bottom reference line (step 8).

As shown in FIG. 6, when the uppermost row of the page image is the top reference line and the bottommost row is the bottom reference line, for example, there are cases where the portion of the image section that is supposed to be corrected does not fit between the top reference line and the bottom reference line.

As a countermeasure, it is necessary to determine whether the corrected top reference line and the corrected bottom reference line need to be parallelly moved (shifted) toward the margins in order for the image section that is supposed to be corrected to fit between the top reference line and the bottom reference line.

In this case, on the respective pages of the book B, it is normal for the uppermost row and the bottommost row to be positioned at the same position throughout, and for there to be the same amount of upper margin and lower margin available on these respective pages; therefore, determining whether the shift is necessary should be done with the first page image PLS as the representative page, for example.

If the shift is not necessary (NO in step 8), the process proceeds to step 10, and if the shift is necessary (YES in step 8), the process proceeds to step 9.

(FIG. 3: step 9)

If it is determined that the shift is necessary in step 8 (YES in step 8), then the corrected top reference line is parallelly moved (shifted) upward while not exceeding the margins, and the corrected bottom reference line is parallelly moved (shifted) downward while not exceeding the margins.

As described above, in the respective pages of the book B, it is normal for the uppermost row and the bottommost row to be positioned at the same position throughout, and for there to be the same amount of upper margin and lower margin available on these respective pages; therefore, after it is determined to what degree to shift the first page image PLS as the representative page, for example, the remaining pages should be shifted in the same amount.

Even if this type of shifting is performed, the shifting is merely parallel movement, and thus the two points at both respective ends of the corrected top reference line and the two points at both respective ends of the corrected bottom reference line, i.e., four points in total, maintain a perfectly quadrilateral (rectangular) shape when connected by perfectly straight lines.

(FIG. 3: step 10 (process B in FIG. 11))

The processes up to step 9 obtained, for all of the left pages PL, the respective corrected page images PL', or namely, the corrected first page image PLS' of the first page image PLS, the corrected final page image PLE' of the final page image PLE, and the corrected middle page image PLM' of the middle page image PLM between the first page image PLS and the final page image PLE.

Furthermore, the processes up to step 9 obtained, for all of the left pages PL, the respective corrected top reference lines BUL' and the corrected bottom reference lines BDL', or namely, the corrected top reference line SBUL' and the corrected bottom reference line SBDL' of the first page image PLS, the corrected top reference line EBUL' and the corrected bottom reference line EBDL' of the final page image PLE, and the corrected top reference line MBUL' and the corrected bottom reference line MBDL' of the middle page image PLM between the first page image PLS and the final page image PLE; thus, a process will be performed to remove the remaining distortions in the corrected images PLS', PLE', and PLM'.

In other words, as explained with reference to FIG. 10 after the description of the flow chart in FIG. 4 (process A), the corrected page images PLS', PLE', and PLM' do not have all of the distortions therein completely removed yet, and it is necessary to perform process B to correct the remaining distortions (step 10).

Hereinafter, process B will be described with reference to the flow chart in FIG. 11. First, the computation unit 42 selects the corrected page image to be processed first (step B1).

The corrected first page image PLS', which has the smallest page number, is selected, for example.

Figure 12:
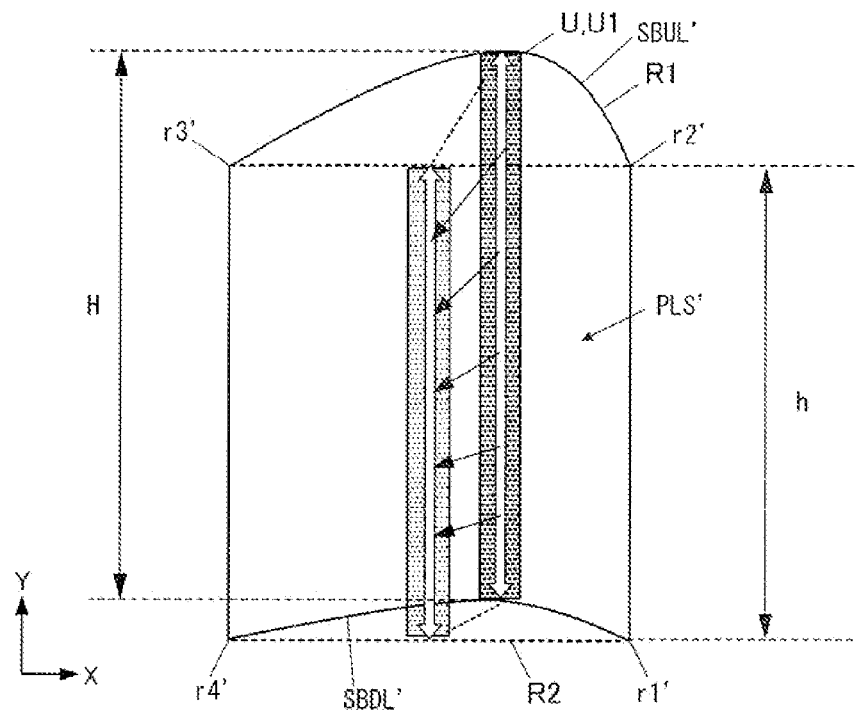
FIG. 12 is a view for explaining vertical correction according to Embodiment 1.

FIG. 12 schematically shows the chosen corrected first page image PLS'.

The corrected first page image PLS' is the result of projection by the projection matrix SA, and thus has already had distortion correction such that the two points (r2' and r3') at the respective ends of the corrected top reference line SBUL' and the two points (r1' and r4') at the respective ends of the corrected bottom reference line SBDL', i.e., a total of four points, form a perfectly quadrilateral (rectangular) shape when connected by perfectly straight lines to form an outline R2 (hereinafter, also referred to as "rectangular outline R2"). As can be seen from the corrected top reference line SBUL' and corrected bottom reference line SBDL', however, the corrected first page image PLS' itself still has a curve remaining in the seam direction (Y direction).

This curve is from the curve of the page during actual imaging, but the portion of the corrected first page image PLS' (see reference character "U") that is curved the most has been imaged in a state closer to the camera 22 than the horizontal ends of the corrected first page image PLS', and thus appears larger than the horizontal ends.

In other words, the region U that extends from the corrected top reference line SBUL' near the center in the horizontal direction of the corrected first page image PLS' to the corrected bottom reference line SBDL' along the seam direction is larger (longer) in the seam direction than the rectangular outline R2.

In this manner, the length in the seam direction of the corrected first page image PLS' varies in the horizontal direction of the corrected first page image PLS', and a vertical correction process is performed in order to make the length equal and so as to fit within the rectangular outline R2.

Figure 11:
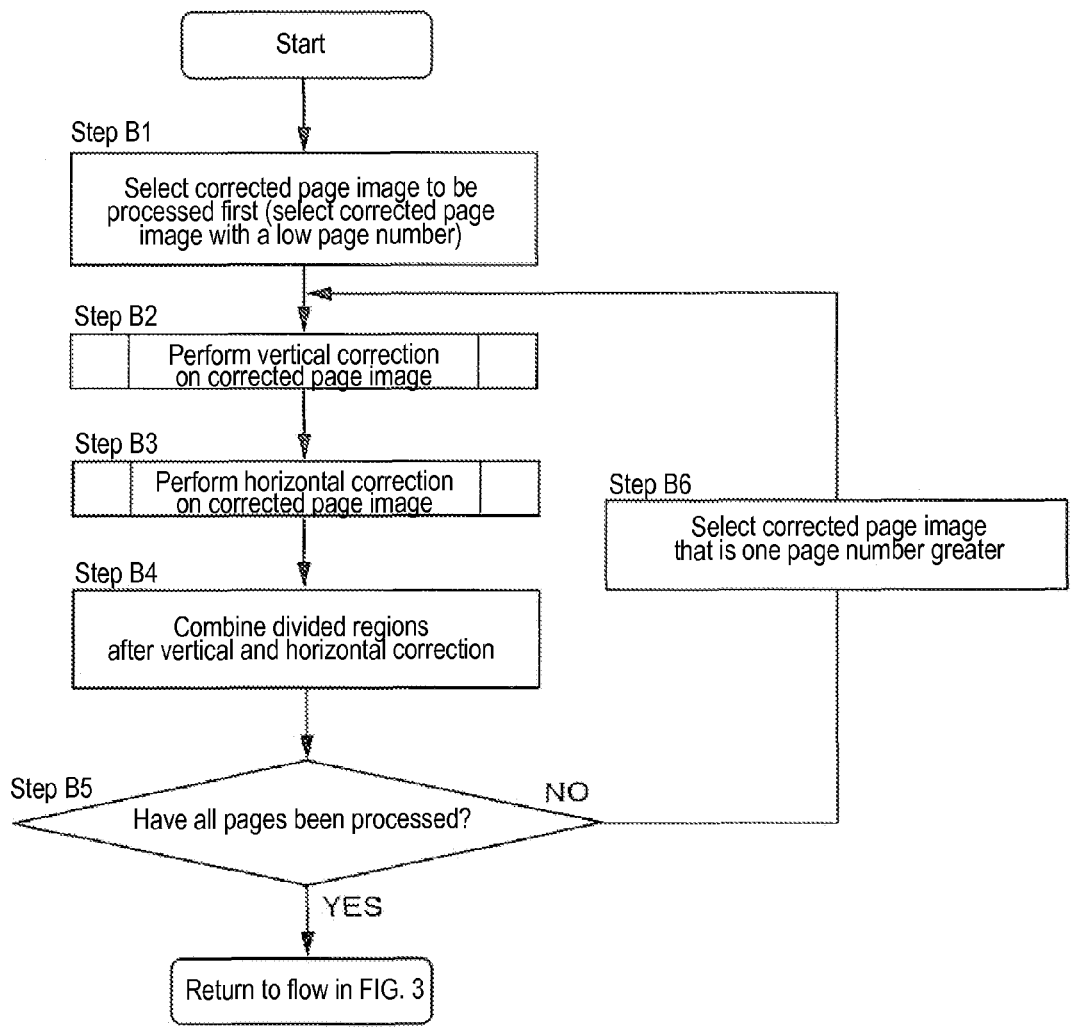
FIG. 11 is a flow chart of process B according to Embodiment 1.

First, before explaining the vertical correction process of the corrected page image in step B2 as shown in FIG. 11, the conversion scheme used in the vertical correction process will be explained with reference to the schematic drawing shown in FIG. 13.

It should be noted that, hereinafter, an outline R1 in the corrected first page image PLS' is formed by the corrected top reference line SBUL' and the corrected bottom reference line SBDL' of the corrected first page image PLS' in FIG. 12 and the respective straight lines connecting both ends of the corrected top reference line SBUL' and the corrected bottom reference line SBDL'.

Figure 13:
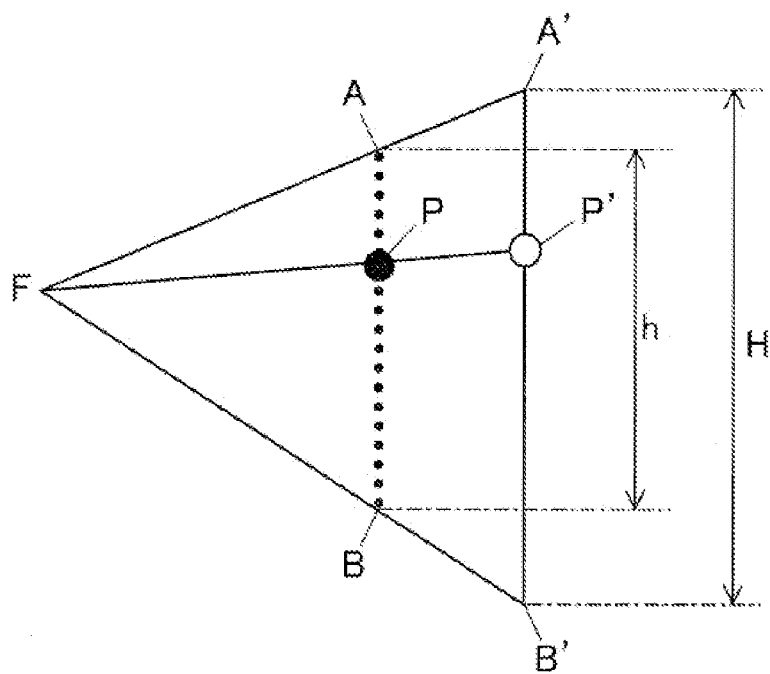
FIG. 13 is a view for explaining a conversion equation for the vertical correction according to Embodiment 1.

The reference character "F" in FIG. 13 is a focal point that has been added for convenience. A' is any point above the region U in the outline R1 of the corrected first page image PLS', B' is any point below the region U in the region U, P' is any point on the line A'-B', A is a point inside the rectangular outline R2 and above a section corresponding to the region U, B is a point inside the rectangular outline R2 and above a section corresponding to the region U, and P is a point corresponding to a point P' on the line A-B.

The following relationships can be understood from FIG. 13:

$$\triangle A'FB' \propto \triangle AFB$$

$$\therefore FP:FP'=h:H$$

$$\triangle AFP \propto \triangle A'FP'$$

$$\therefore AP:A'P'=h:H$$

$$\therefore AP=h/H \cdot A'P'$$

If ya is the Y-coordinates at point A, yp is the Y-coordinates at point P, ya' is the Y-coordinates at point A', and yp' is the Y-coordinates at point P', then:

$$A'P'=ya'-yp'$$

$$AP=ya-yp$$

Thus, $$\therefore yp = h/H \cdot (yp' - ya') + ya \quad (11)$$

This formula (11) can find the Y-coordinates of P after conversion for any point P'.

In practice, correction is performed to match the gradients of the respective points in the outline R1 to the gradients of the corresponding points in the mesh in the rectangular outline R2.

Figure 14:
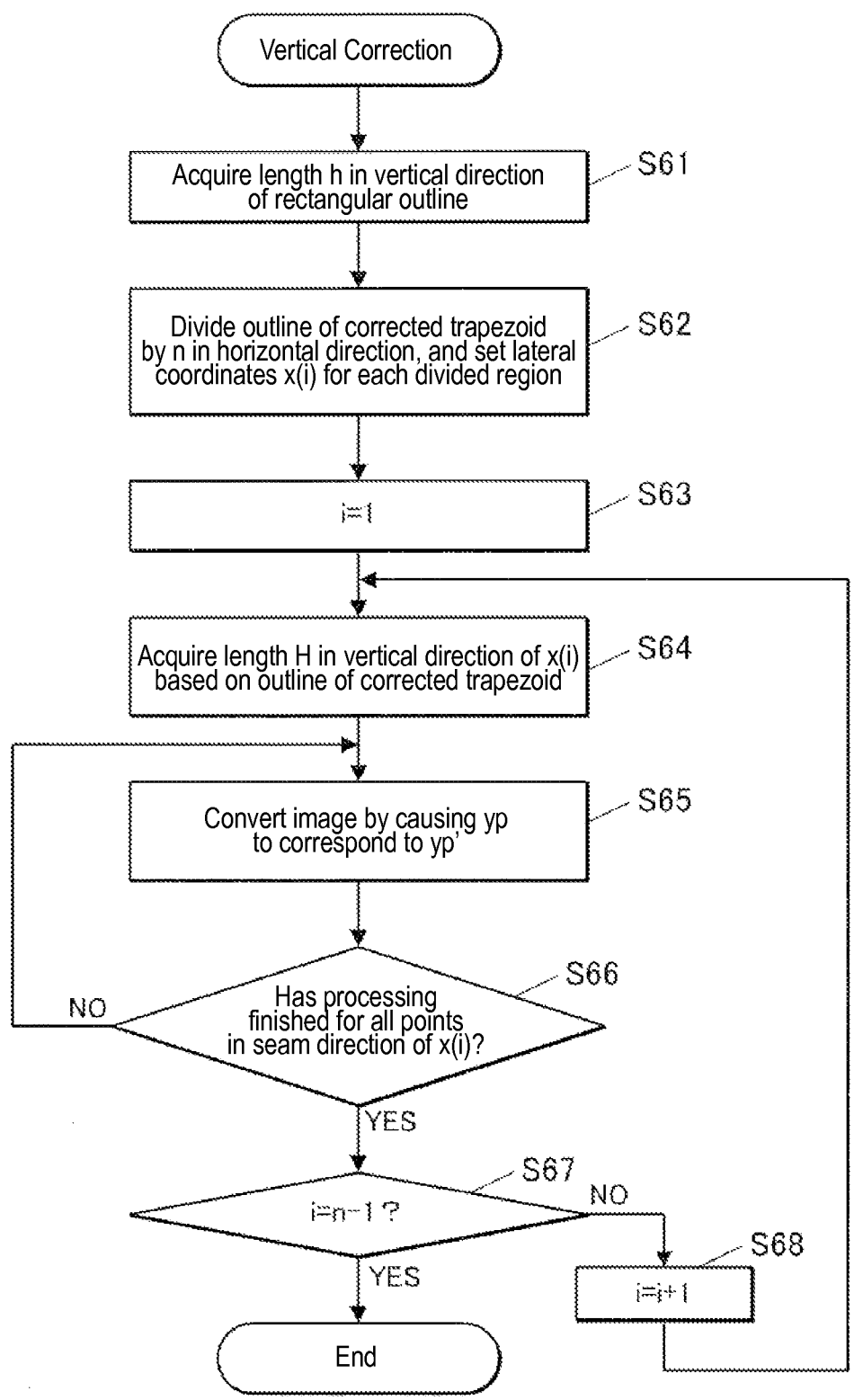
FIG. 14 is a flow chart of the vertical correction according to Embodiment 1.

(FIG. 11: step B2 (vertical correction process in FIG. 14)

Next, the flowchart in FIG. 14 will be used to explain the flow of the vertical correction (vertical correction process) of the corrected page image described above.

First, the computation unit 42 obtains a length h in the seam direction of the rectangular outline R2 (step S61).

Specifically, the gap from top to bottom on the right side or the left side of the outline R1 in the corrected initial image PLS', or namely, the gap between r1' and r2' in FIG. 12 or the gap between r4' and r3' in FIG. 12 is the length h.

Next, the computation unit 42 divides the outline R1 of the corrected first page image PLS' by n in the horizontal direction and sets the lateral coordinates x (i) of the respective divided regions U1 (step S62). In other words, the computation unit 42 is a dividing unit according to the present invention.

Next, the computation unit 42 sets i to 1 (step S63).

Furthermore, the computation unit 42 obtains a length H in the vertical direction of x(i) based on the outline R1 of the corrected first page image PLS' (step S64).

The computation unit 42 calculates the Y-coordinates (yp') corresponding to the P' point on the border between the divided regions U1 using the formula (11), and converts the image of the P' points (step S65).

Next, the computation unit 42 determines whether the conversion process has finished for all of the points in the seam direction of x(i) (step S66), and if the process has not finished (NO in step S66), the computation unit 42 transitions to step S65. If the process has finished (YES in step S66), then the computation unit 42 transitions to step S67.

Next, in step S67, the computation unit 42 determines whether i is n−1 (step S67), and if i is n−1 (YES in step S67), then the computation unit 42 ends the vertical correction process and returns to the flowchart in FIG. 11. If i is not n−1 (NO in step S67), then the computation unit 42 transitions to step S68.

If the computation unit 42 has transitioned to step S68, then the computation unit 42 transitions to step S64 as i=i+1. In this manner, vertical correction is performed for all borders among the n-amount of divided regions U1.

Thus, the computation unit 42 forms part of a first correction unit that corrects the length in the seam direction for each of the divided regions U1 in the present invention.

The explanation will be continued after returning to FIG. 11. In step B3, the computation unit 42 performs horizontal correction on the corrected first page image PLS' after vertical correction. In other words, the computation unit 42 forms a part of a second correction unit in the present invention.

Figure 15:
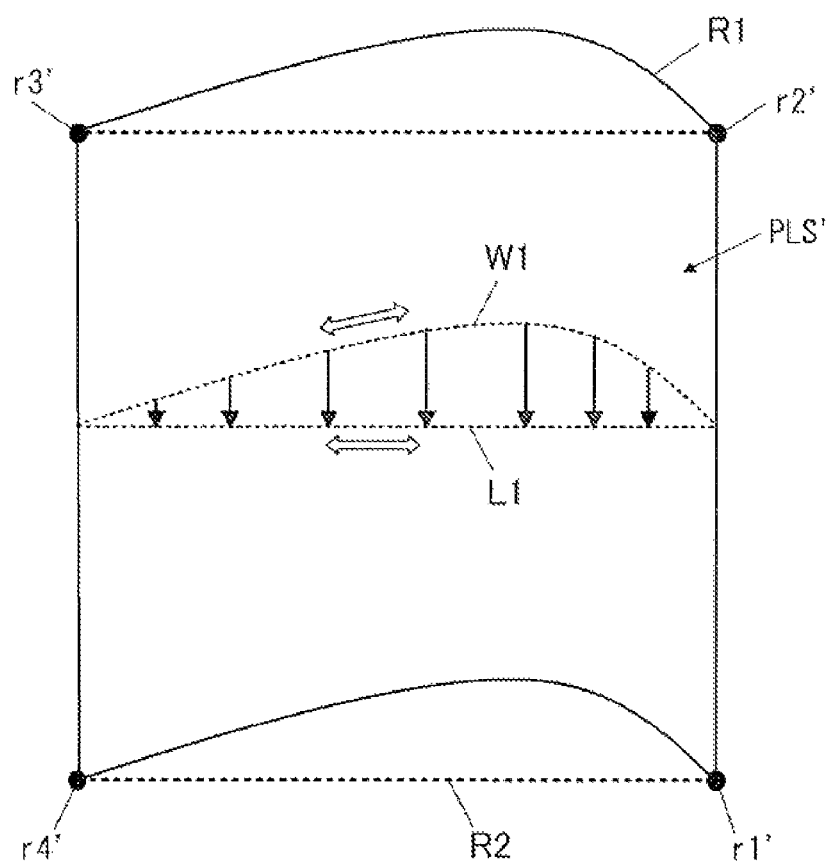
FIG. 15 is a view for explaining horizontal correction according to Embodiment 1.

FIG. 15 schematically shows the corrected first page image PLS' after vertical correction and the outline R1 thereof, and the rectangular outline R2.

It should be noted that, hereinafter, unless otherwise specified, the corrected first page image PLS' after vertical correction is referred to as merely the corrected first page image PLS'.

As shown in FIG. 15, there is still a curve remaining in the seam direction of the corrected first page image PLS' and the outline R1 thereof, and it is thus necessary to correct curved line W1 to match straight line L1 as shown in FIG. 15. At this time, the horizontal direction location will differ depending on the amount of correction, and thus horizontal correction is performed in step B3.

(FIG. 11: step B3 (horizontal correction process in FIG. 16))

Figure 16:
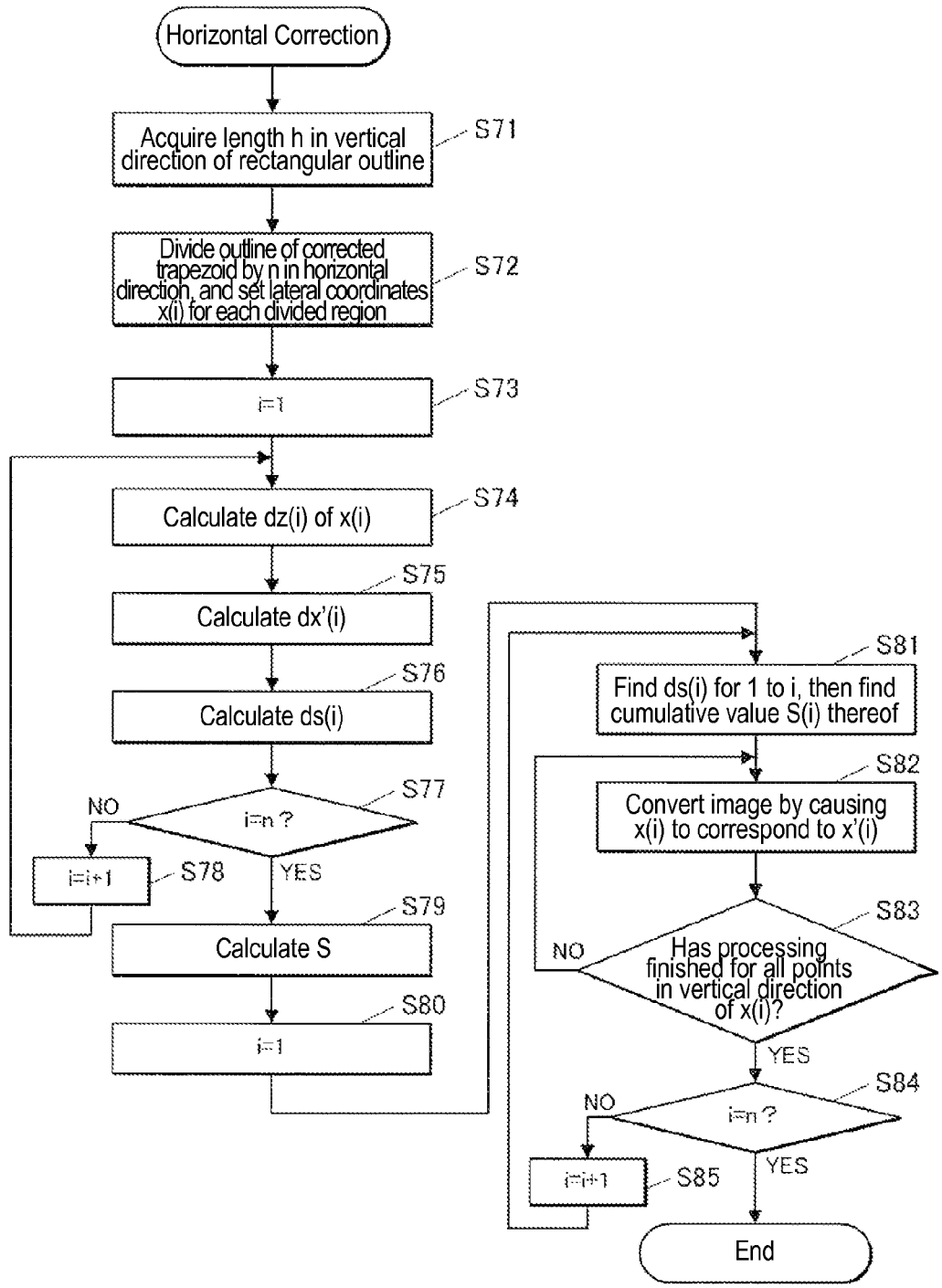
FIG. 16 is a flow chart of the horizontal correction according to Embodiment 1.

FIG. 16 is a flow chart showing the horizontal correction process.

The computation unit 42 obtains the length h in the seam direction of the rectangular outline R2 (step S71).

Next, the computation unit 42 divides the outline R1 of the corrected first page image PLS' by n in the horizontal direction, and sets the lateral coordinates x(i) of the respective divided regions U1 (step S72).

Next, the computation unit 42 sets i to 1 (step S73).

The computation unit 42 estimates the deflection amount dz(i) at x(i) (step S74). In other words, the computation unit 42 is an estimation unit of the present invention.

Figure 17A:
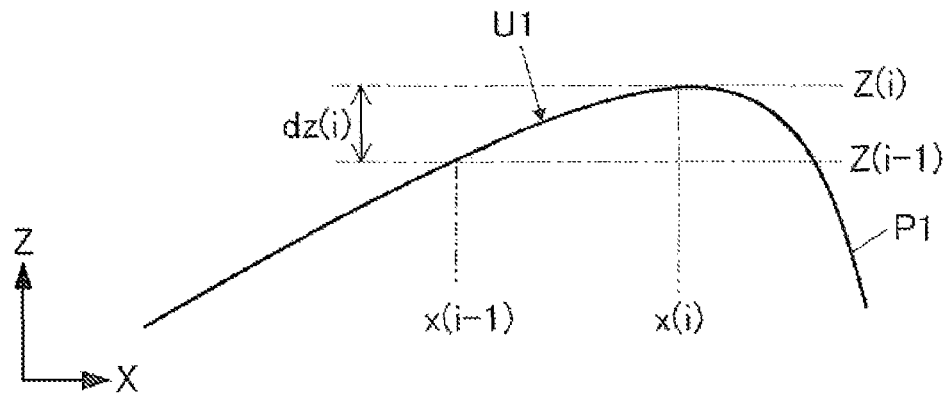
FIGS. 17A and 17B show a deflection amount d(z) of a divided region according to Embodiment 1.
Figure 17B:
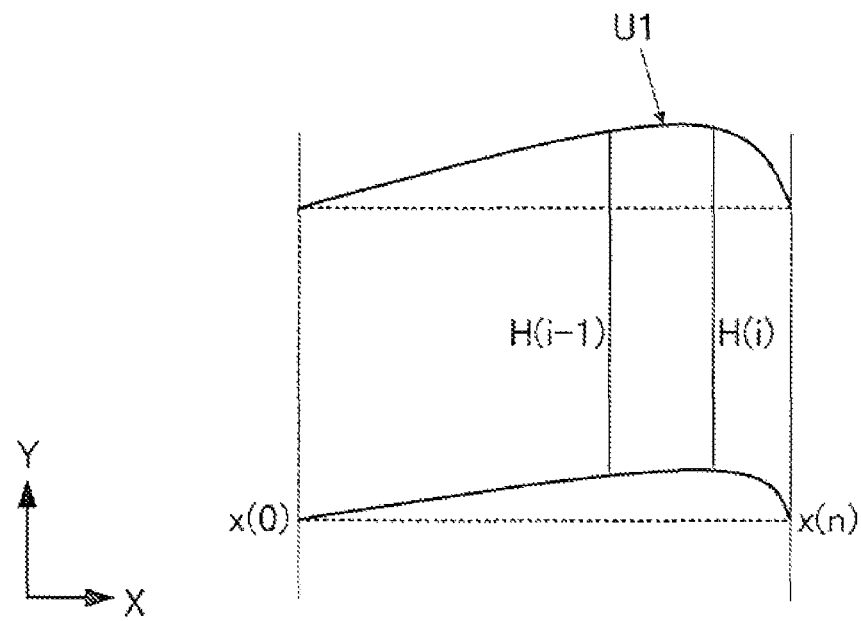

FIGS. 17A and 17B show the deflection amount d(z) in the divided regions U1. FIG. 17A is a cross-sectional view of actual page P1, and FIG. 17B is a front view of the corrected first page image PLS'.

As shown in FIG. 17A, the deflection amount dz(i) in the direction (Z direction) normal to the actual page P1 is, strictly speaking, found by the difference in the Z direction between the $i^{th}$ divided region U1 and the i−1 divided region U1. This calculation, however, requires measuring the distance from the camera 22 to the surface of the paper, the angle, and the like, which takes time and effort. If the width of the divided region U1 is small, then the difference between the length H(i) in the seam direction of the $i^{th}$ divided region U1 and the length H(i−1) of the i−$1^{th}$ divided region U1 approaches the deflection amount dz(i). This relationship is used to estimate the deflection amount dz(i) of the divided region U1.

Specifically, the deflection amount dz(i) is estimated using formula (1).

$$dz(i) = k \cdot \{H(i) - H(i-1)\} \quad (1)$$

where k is any coefficient. This coefficient k makes it possible to adjust the image in the horizontal direction after horizontal correction processing. Calculation will be performed assuming k=1.

Referring back to the flowchart in FIG. 16, the computation unit 42 finds the actual width dx'(i) (step S75).

dx(i) is the width of the $i^{th}$ divided region U1 in the corrected first page image PLS'.

$$dx(i) = x(i) - x(i-1) = \{x(n) - x(0)\}/n$$

The actual width dx'(i) is modified by the height z(i) of x(i). When z(i) is high, width also increases in a manner similar to when H becomes greater. In other words, the actual width dx'(i) is small. This relationship is summarized by the formula below:

$$dx'(i) = h/H(i) \cdot dx(i)$$

Next, the computation unit 42 finds ds(i) (step S76).

ds(i) is the small length of the actual page P1 of the $i^{th}$ divided region U1.

Figure 18:
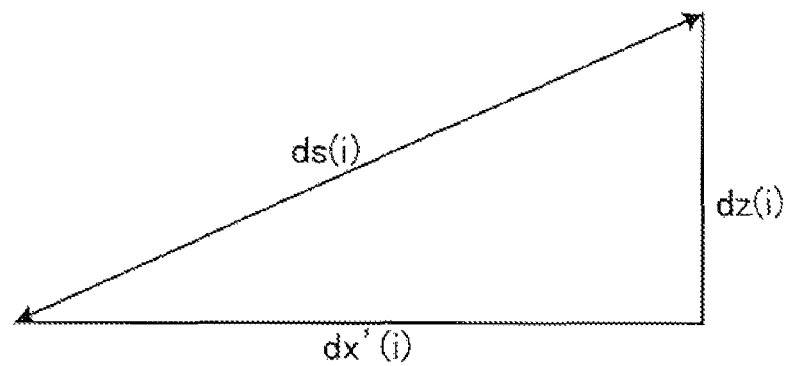
FIG. 18 shows the relationship among ds(i), dz(i), and dx'(i) according to Embodiment 1.

FIG. 18 explains the relationship among ds(i), dz(i), and dx'(i).

As shown in FIG. 18, ds(i) is calculated by the Pythagorean theorem in accordance with the length dz(i) in the Z direction found in step S74 and the length dx'(i) in the X direction found in step S75.

$$ds(i) = \{dz(i)2 + dx'(i)2\}1/2$$

Next, the computation unit 42 determines whether i is n or not (step S77), and if i is n (YES in step S77), the computation unit 42 transitions to step S79, but if i is not n (NO in step S77), the computation unit 42 transitions to step S78.

In step S78, the computation unit 42 transitions to step S74 as i=i+1. This finds dz(i), dx'(i), and ds(i) with respect to all n-amount of divided regions U1.

Meanwhile, in step S79, the computation unit 42 finds the length S in the horizontal direction of the actual page P1. Specifically, the computation unit 42 finds the sum of all ds(i) for the n-amount of divided regions U1 in order to calculate the length S in the horizontal direction of the actual page P1.

Then, the computation unit 42 sets i to 1 again (step S80).

Next, the computation unit 42 finds ds(i) for the divided region U1 from 1 to the $i^{th}$ in order to calculate the cumulative value S(i) (step S81).

Next, the computation unit 42 causes x(i) to correspond to x'(i) to convert the image (step S82).

Figure 19:
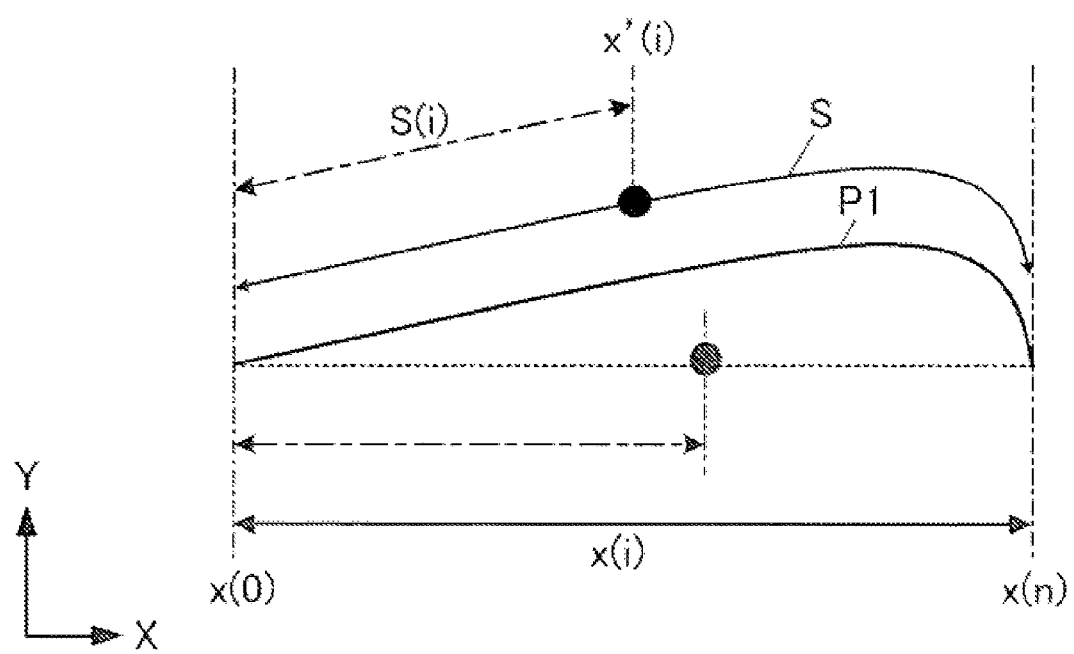
FIG. 19 shows the relationship between pre-horizontal correction x'(i) and post-horizontal correction x(i) according to Embodiment 1.

FIG. 19 explains the relationship between x'(i) before horizontal correction and x(i) after horizontal correction. As shown in FIG. 19, the ratio of S of the actual page P1 to S(i) results in the same value as the ratio of the length from x(0) to x(n) to the length from x(0) to x(i); thus, this results in the formula below:

$$S:S(i)=x(n)-x(0):x(i)-x(0)$$

Converting x'(i) to x(i) in accordance with this relationship changes the image at any point P. It should be noted that the conversion scheme is x(i), f(x'(i)), but this formula is not strictly set, and x'(i), which corresponds to S(i), is sequentially found and made to correspond to x(i).

Then, the computation unit 42 determines whether the conversion process has finished for all of the points in the seam direction of x(i) (step S83), and if the process has not finished (NO in step S83), the computation unit 42 transitions to step S82. If the process is finished (YES in step S83), then the computation unit 42 transitions to step S84.

Next, the computation unit 42 determines whether i is n (step S84), and if i is n (YES in step S84), the computation unit 42 ends the horizontal correction process and returns to the flow in FIG. 11. If i is not n (NO in step S84), the computation unit 42 transitions to step S85.

In step S85, the computation unit 42 transitions to step S81 as i=i+1. This performs horizontal correction on all n-amount of divided regions U1.

(FIG. 11: step B4)

If YES in step S84, the computation unit 42 returns to the flow in FIG. 11, and then combines the vertical corrected and horizontal corrected n-amount of divided regions U1 to create an entire image (step B4). In other words, the computation unit 42 is a combining unit of the present invention.

Specifically, the lengths in the horizontal direction that have been corrected by the horizontal correction process are cumulatively added to combine the n-amount of divided regions U1 after vertical correction, and the result is stored in the storage unit (HDD) 41.

(FIG. 11: step B5)

Next, the computation unit 42 determines whether all of the left pages PL have been processed (step B5), and if there are pages that have not been processed (NO in step B5), the computation unit 42 selects a pre-processed corrected first page image PL' that is one page number greater (step B6), returns to step B2 again, and then, using a similar procedure to before, performs vertical correction, horizontal correction, and combining of the divided regions with respect to this new pre-processed corrected first page image PL'.

Meanwhile, if all of the left page images PL have been processed (YES in step B5), this means that images with no distortions have been obtained in regards to all of the left page images PL; thus, the computation unit 42 ends the process, and processes the right page images PR with a similar procedure to that described above.

It should be noted that the process B explained above corrects distortions remaining in corrected page images that have each been projected by the projection matrix.

When performing this process, the corrected page image, the corrected top reference line, and the corrected bottom reference line corresponding to the corrected page image are used.

In the present embodiment, an example was shown in which the corrected page image and the corrected top reference line and the corrected bottom reference line corresponding to the corrected page image are found before process B, but it is not necessary to find this before process B.

It is possible to have a scheme whereby every time each page image is selected in process B, the projection matrix for the page image is found in accordance with the linearity, the projection matrix that has been found is used to obtain the corrected page image, and then the corrected top reference line and the corrected bottom reference line corresponding to the corrected page image are found in accordance with the linearity, after which the processes in steps B2 to B5 may be performed.

Furthermore, in the present embodiment, when finding dz(i) in the horizontal correction process, the coefficient k (k=1, for example) is used in formula (1).

This process makes the respective divided regions U1 equal in the horizontal direction, while causing problems for accuracy with respect to total horizontal length.

In FIG. 20A, for example, correction is performed on page P1, which exhibits a small degree of curvature. In FIG. 20B, correction is performed with the same page P1 as in FIG. 20A, but with greater curvature. As is clear from FIGS. 20A and 20B, corrected images Q1 and Q2 differ with respect to the horizontal lengths thereof. This is due to the degree of curvature greatly affecting the difference between H(i) and H(i−1), even if the width of the actual page P1 is the same. Processing can be performed using the coefficient k in order to suppress this variation.

In other words, in practice, the aspect ratio (a standard paper size, for example) of page P1 is already known, and thus the ratio of the horizontal width in the image found in step B4 in FIG. 11 to the horizontal width found from the aspect ratio of P1 corresponds to the coefficient k.

Accordingly, enlarging or shrinking the image found in step B4 in the horizontal direction in accordance with this ratio makes it possible to find an image with no distortions at a desired aspect ratio.

Specifically, it is preferable that the image be enlarged or shrunk in the horizontal direction such that a corrected image that includes margin areas becomes a prescribed size (such as a standard paper size, for example).

As described above, in the present embodiment, the entire outline of the corrected page image is corrected first, i.e., before the corrected page image, which has had distortion correction performed thereon by the projection matrix, is divided into the substantially rectangular divided regions U1 that extend in the seam direction; therefore, it is possible to make the corrected page image easier to divide into the divided regions U1.

Furthermore, after the length in the seam direction is corrected for each of the divided regions U1, the deflection amount normal to the actual page P1 for the divided regions U1 is estimated, and the length in the horizontal direction is also corrected in accordance with this estimated deflection amount; therefore, it is possible to efficiently perform both correction in the seam direction and correction in the horizontal direction.

Accordingly, even if a curved page is imaged, it is possible to perform appropriately and efficiently the correction so that the extracted image becomes easier to decipher.

Furthermore, because the deflection amount of the divided region U1 is estimated in accordance with the length of the divided region U1 in the seam direction, the deflection amount does not need to be actually measured, which makes it all the more efficient to find the deflection amount.

Moreover, the lengths in the horizontal direction that have been corrected by the horizontal correction process are cumulatively added to combine the n-amount of divided regions U1 that have already undergone vertical correction. It is thus possible to correct the length in the horizontal direction for the entire image in an appropriate manner.

It is theoretically possible to determine the top reference lines and bottom reference lines for all of the page images, to find the projection matrix based on the four reference points, and then to find the corrected top reference lines and the corrected bottom reference lines after projection through the projection matrix. In the present embodiment, however, the top reference lines and the bottom reference lines are determined for the first page and the final page, the projection matrix is found in accordance with the four reference points, and the corrected top reference lines and the corrected bottom reference lines are found after projection through the projection matrix. The pages between the first and final pages have the projection matrix, corrected top reference lines, and corrected bottom reference lines thereof found in accordance with a linearity, thereby making it possible to decrease significantly the amount of computation, and to improve processing speed.

It should be noted that in the present embodiment, it is the first page and the final page for which the top reference lines and the bottom reference lines are determined. The projection matrix is found in accordance with the four reference points, and the corrected top reference lines and the corrected bottom reference lines are found after projection through this matrix, but it is not strictly necessary to use the first page and the final page.

It is possible to select the first page and the final page and to find the projection matrix, corrected top reference lines, and corrected bottom reference lines in accordance with the linearity for any number of pages therebetween.

(Acquiring Top Reference Line and Bottom Reference Line)

The imaging process was entirely explained above, and thus the specific acquisition method for the reference curves (top reference line and bottom reference line) as shown in step A1 in FIG. 4 will be further described below.

Figure 21:
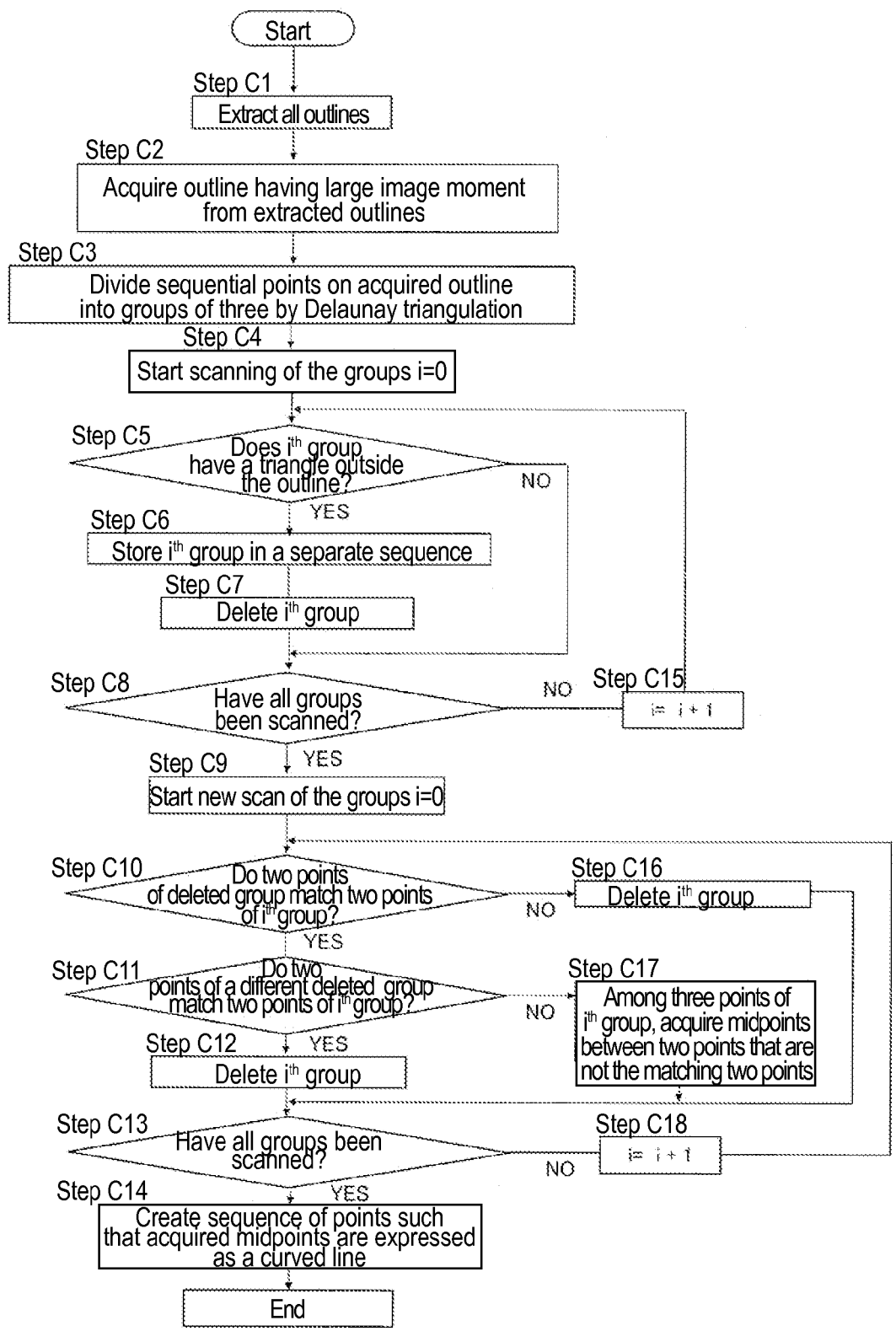
FIG. 21 is a flow chart for obtaining a reference curve according to Embodiment 1.

FIG. 21 is a flow chart of the acquisition procedure for the reference curves.

Note that the procedure for obtaining the top reference line and the procedure for obtaining the bottom reference line differ only in location on the page image, and the process content itself is the same; therefore, these lines will be collectively explained as "reference curves" below.

First, if there are appropriate reference curves such as the curved lines shown in FIG. 5, then automatic processing is possible. In such a case, the computation unit first 42 extracts all the outlines (step C1).

Next, the computation unit 42 finds the second moment (moment of inertia) from the extracted outlines, finds the second moment $I=m02+m20$ around the centroid in accordance with the obtained second moment m02, m20, and acquires the outline with the largest amount as the outline that should be the reference curve.

Note that, in the case shown in FIG. 5, steps C1 and C2 may be divided for the top of the page image (extraction of top reference line) and the bottom of the page image (extraction of bottom reference line).

This second moment around the centroid is an elongated shape with a large value; therefore, curved lines that extend in an elongated manner in the horizontal direction seen in the top and bottom of FIG. 5 are extracted.

Figure 22:
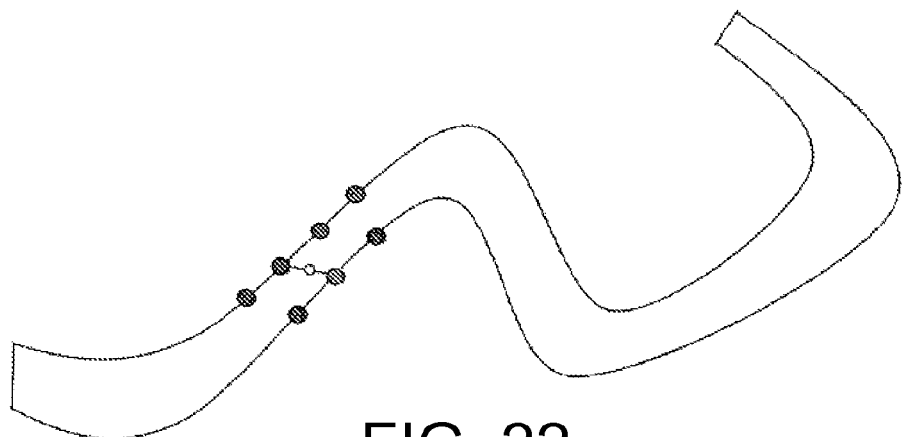
FIG. 22 is a view for explaining an outline of the extracted reference curve according to Embodiment 1.

FIG. 22 is a schematic view of a curved line that is the outline extracted as a reference curve.

The black dots in FIG. 22 show some of the coordinate points that form the outline, and it is necessary for the line extracted as the outline to be obtained as a single curved line with a sequence of points.

If only coordinate locations were to be used, there would be a bottom sequence of points positioned further up than the sequence of points located at the top in this outline, which would lead to curved lines with a plurality of patterns, thereby inducing variation.

In order not to cause such variation, it is possible to obtain a curved line that passes through the middle of this outline.

Namely, in FIG. 22, a midpoint such as the white dot should be found, and a collection (sequence) of these midpoints can be acquired as the reference curved line.

It is not determined, however, from which pairs of coordinate points (black dots) on the outline that the midpoints should be found. Thus, a curved line that passes through the center of the outline is found with the procedure below.

First, the computation unit 42 uses Delaunay triangulation to divide the point sequences of the obtained outline into units having three points for every one set (step C3).

In other words, the coordinate points on the outline are connected to form sets of three with as little area as possible and closely resembling an equilateral triangle. Triangulation is then performed on the outline.

Figure 23:
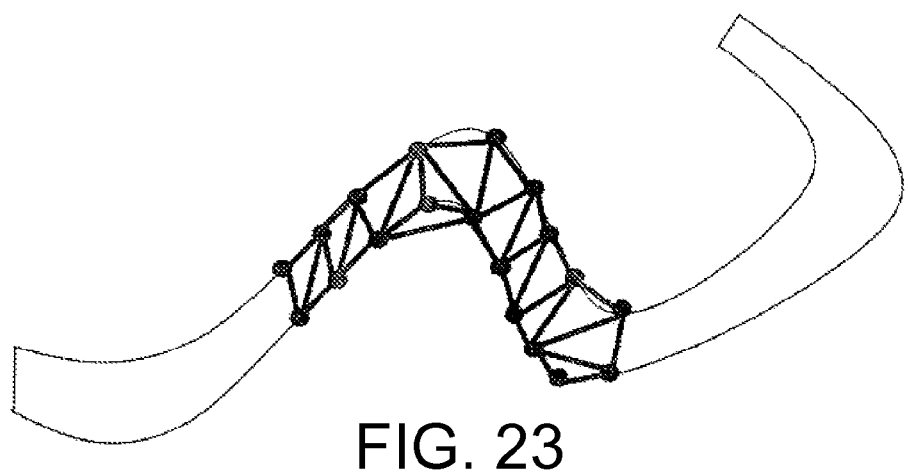
FIG. 23 is a view showing a state in which the outline of the reference curve has been divided into triangles according to Embodiment 1.

FIG. 23 shows a state in which the inside of the outline has been triangulated.

Figure 24:
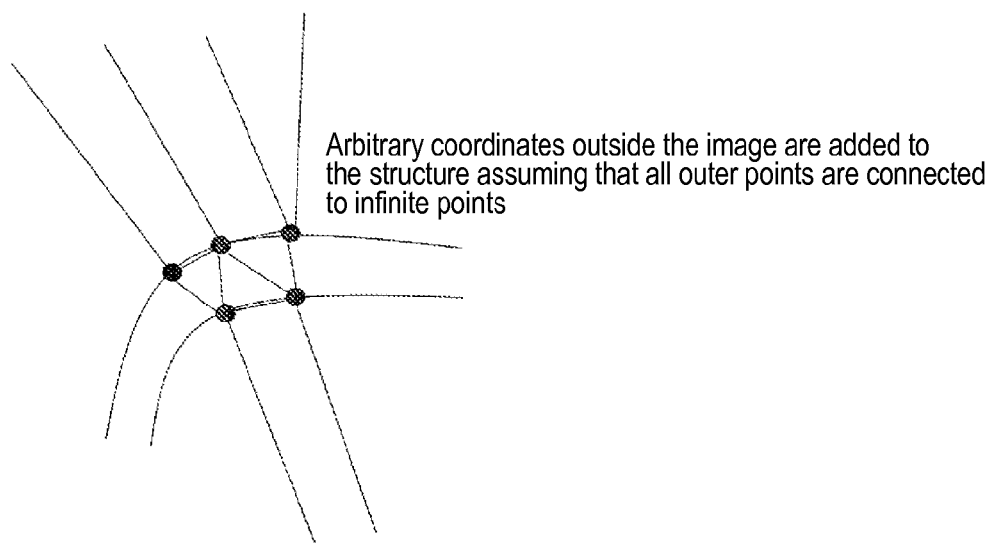
FIG. 24 is a view for explaining triangularly divided sections outside the outline of the divided triangles according to Embodiment 1.

It should be noted that, although not shown in FIG. 23, the two points that cannot form a triangle are set as infinite and hypothetical points as shown in FIG. 24, and made to form a triangle.

Next, groups that are unsuitable for forming triangles are removed.

Assume, for example, that there are n-amount of groups forming triangles, including groups depicted on the outside of the outline.

The computation unit 42 starts a scan for removing these unsuitable triangle groups with i=0 (step C4).

Among the triangle groups, the triangles located on the outside of the outline do not include midpoints inside the outline; therefore, the computation unit 42 determines whether the selected $i^{th}$ group forms a triangle positioned outside the outline (step C5). If the group forms a triangle inside the outline (NO in step C5), there is a possibility that the group forms a triangle having a midpoint inside the outline, and thus the computation unit proceeds to step C8 without deleting the group.

On the other hand, if the $i^{th}$ group forms a triangle located outside the outline (YES in step C5), then this $i^{th}$ group is stored in a different sequence (step C6), and the i$^{th}$ group is deleted from the sequence where the triangulation data is stored (step C7).

It should be noted that the reason the i$^{th}$ group is stored in another sequence and not completely deleted in step C6 is that this group will later be used to find unnecessary groups of triangles.

Next, the computation unit 42 determines whether all of the groups have been handled (does i=n−1?) (step C8), and if scanning has not finished for all of the groups (NO in step C8), then the computation unit 42 returns to step C5 again with i=i+1 (step C15).

If scanning has finished for all of the groups (YES in step C8), then the computation unit 42 starts a new scan for groups at i=0 (step C9).

The group remaining in the triangulation data sequence that was not deleted by the scanning described above will be referred to below as the m group.

The computation unit 42 determines whether two points from any of the groups that were deleted and that were previously stored in a different sequence match with two points of the i$^{th}$ group (step C10), and if there are not two points matching with the i$^{th}$ group (NO in step C10), then the i$^{th}$ group is deleted (step C16) and the computation unit 42 moves to step C13.

If the sides of the triangle are positioned on the outline, then the sides will be shared with the triangle having infinite and hypothetical points (the deleted triangle that was previously stored in a different sequence), but for NO in step C10, the two points do not match, and thus the sides are not shared, which means that this i$^{th}$ group does not share sides with the outline.

Figure 25:
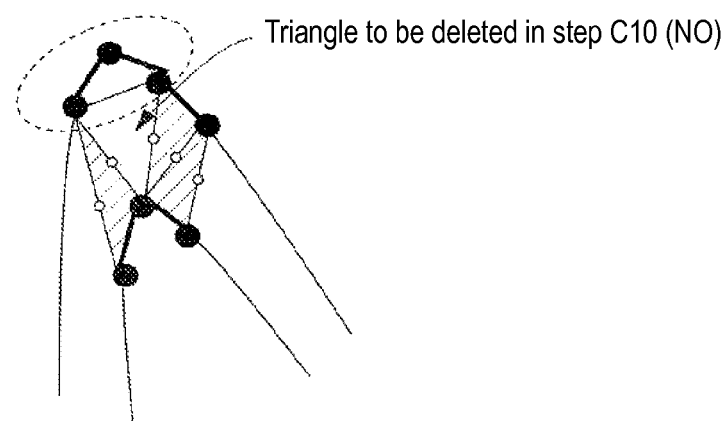
FIG. 25 is a view for explaining the process to find the midpoint of the outline without the unnecessary triangles in the divided triangles according to Embodiment 1.

As shown in FIG. 25, such a triangle only has the same midpoint as the midpoint found from the triangle in the abutting outline; therefore, it is not only unnecessary to find the midpoint, but using this triangle to find the midpoint will create duplicate midpoints. Thus, deletion is performed because this would also require another process to delete the redundant midpoint data in order to have only a single midpoint.

Returning to the flow in FIG. 21, if the computation unit 42 determines two points from any of the groups that are were deleted and that were previously stored in a different sequence match with two points of the i$^{th}$ group (YES in step C10), then the computation unit 42 determines whether two points in a different deleted group match the two points in the i$^{th}$ group (step C11).

If the two points from a different deleted group match the two points from the i$^{th}$ group (YES in step C11), then when combined with the group previously discovered in step C10, the i$^{th}$ group shares sides with two triangles that will be deleted for being triangles outside the outline.

In other words, the triangle formed by the i$^{th}$ group forms a triangle located in the position surrounded by the dotted line in FIG. 25.

As can be understood from FIG. 25, this triangle surrounded by the dotted line has three points on a line on one side of the outline, and is not a triangle that cuts across the inside the of the outline; therefore, the triangle does not have a midpoint in the outline.

Thus, for YES in step C11, the computation unit 42 erases the i$^{th}$ group (step C12), and then proceeds to step C13.

Meanwhile, for NO in step C11, a triangle having a midpoint in the outline is already formed; thus, among the three points in the i$^{th}$ group, the midpoints (see the white dots on the slanted triangles in FIG. 25) of the sides connecting two points matching with one point that is matching two points of the deleted group is obtained (step C17), after which the computation unit 42 proceeds to step C13.

It should be noted that, in this process, duplicate points that are the same as the midpoints of triangles having abutting midpoints are obtained, and thus it is necessary to perform an overlap removal process to remove this duplicate midpoint data.

This duplicate removal process may be performed after all midpoints have been obtained, or the duplicate midpoint data may be removed when a duplicate midpoint is encountered during acquiring of the midpoints.

Next, the calculation unit 42 determines whether all groups have been scanned (i=m−1?) (step C13), and if all groups have not been scanned (NO in step C13), the calculation unit 42 then returns again to step C10 with i=i+1 (step C18).

On the other hand, if the scanning for all groups has finished (YES in step C13), the calculation unit 42 arranges the midpoints into a curved line in order to create a reference curve, i.e., a series of points (point coordinates) (top reference line, bottom reference line) (step 14).

Note that the explanation above involved a curved line as the reference line, such as shown in FIG. 5, but if there is no such suitable line, then as explained using FIG. 6, virtual markers may be placed on sections of the uppermost row and the bottommost row, and these may be recognized as the reference lines.

Embodiment 2

Figure 26:
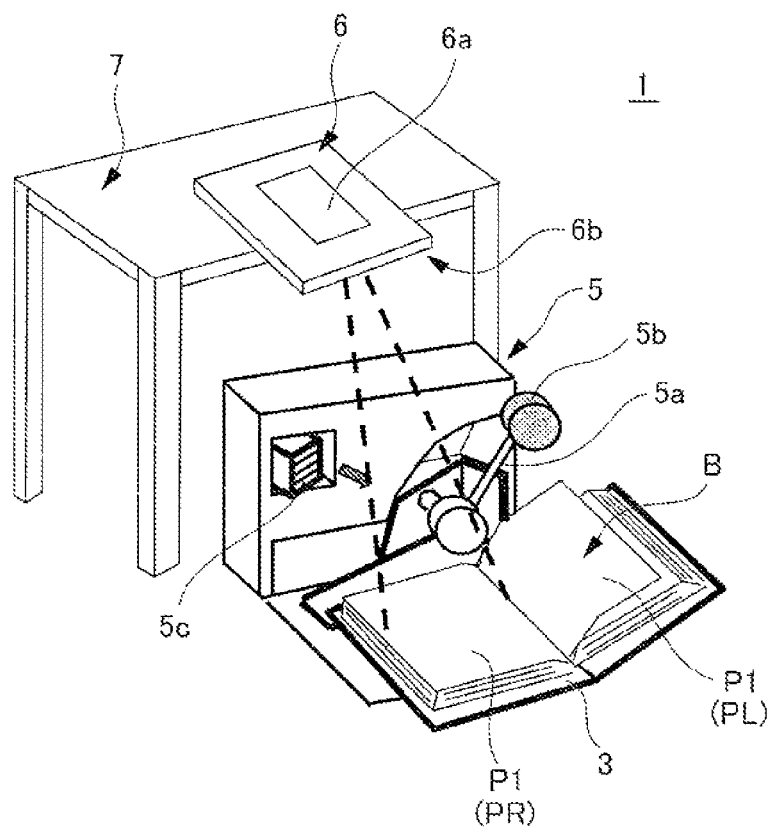
FIG. 26 is a perspective view of a schematic configuration of a document camera system according to Embodiment 2.

FIG. 26 is a view of a configuration in Embodiment 2.

The following primarily explains the differences between Embodiment 1 and Embodiment 2, and overlapping explanations will be omitted.

As shown in FIG. 26, in a document camera system 1 of Embodiment 2, imaging of page images is performed with a camera-equipped tablet 6 placed on a stationary table 7, and a camera 6b disposed on the rear surface of the camera-equipped tablet 6 positioned in substantially the center of a page of one side of a book B (the right page PR in the drawing).

The camera-equipped tablet 6 also includes a touch-panel display unit 6a on the surface opposite to the camera 6b.

Figure 27:
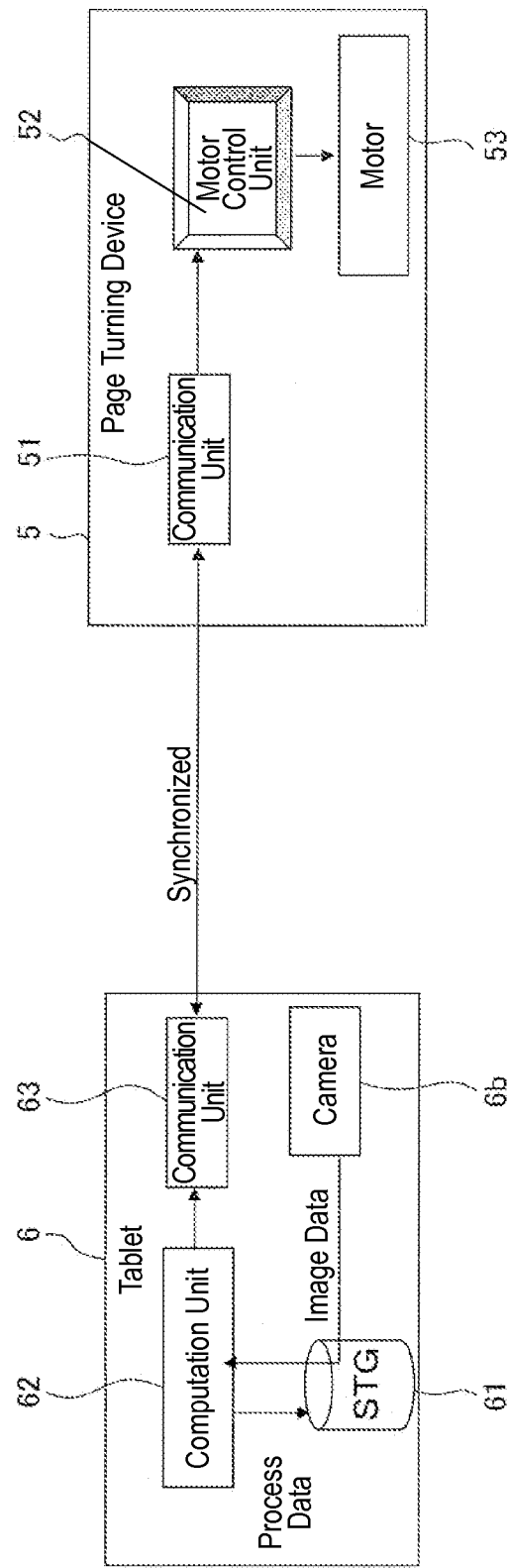
FIG. 27 is a block view of the primary control configuration of the document camera system according to Embodiment 2.

FIG. 27 is a block view of the primary control configuration of the document camera system 1 according to Embodiment 2.

The camera-equipped tablet 6 includes a storage unit (STG) 61, a calculation unit 62, a communication unit 63, and the camera 6b.

The storage unit (STG) 61 stores page images that have been captured, corrected page images, values (reference curves, perturbation amounts, etc.) found by various types of calculations, and the like.

Note that, in FIG. 27, the storage unit (STG) 61 is shown as being inside the camera-equipped tablet 6, but external storage such as cloud storage where only saved data is kept may be used.

The computation unit 62 includes a ROM (not shown) in which various types of programs are recorded, such as a program for automatically capturing a page image by controlling the automatic page turner 5 and the camera 6b (hereinafter, also referred to as "automatic imaging program"), and a program for correcting the page image that was taken (hereinafter, also referred to as "image processing program"). The computation unit 42 further includes a RAM (not shown) in which these programs are extracted during execution of the programs in the ROM, and a CPU (not shown) for extracting and executing the programs in the ROM in the RAM.

The communication unit 63 performs synchronous communication with the automatic page turner 5.

Although not shown in FIG. 27, the camera-equipped tablet 6 includes a touch-panel display unit, and this display unit serves as an operation unit.

Furthermore, FIG. 26 shows an example in which communication between the camera-equipped tablet 6 and the automatic page turner 5 is wireless, but this communication may be wired instead.

If the document camera system 1 is formed in this way along with the camera-equipped tablet 6, it is possible to perform acquisition of reference curves with an operation unit that has excellent operability with respect to touch operation, for example.

Embodiment 2 is the same as Embodiment 1 in that the calculation unit 62 performs the same processes as described in Embodiment 1, but as described above, in Embodiment 2 imaging is performed with the position of the camera 6b in approximately the center of a page of one side of the book B (the right side PR in the drawing); therefore, if one of either the top reference line or the bottom reference is acquired, it is possible to obtain the other reference line through image processing.

Figure 28:
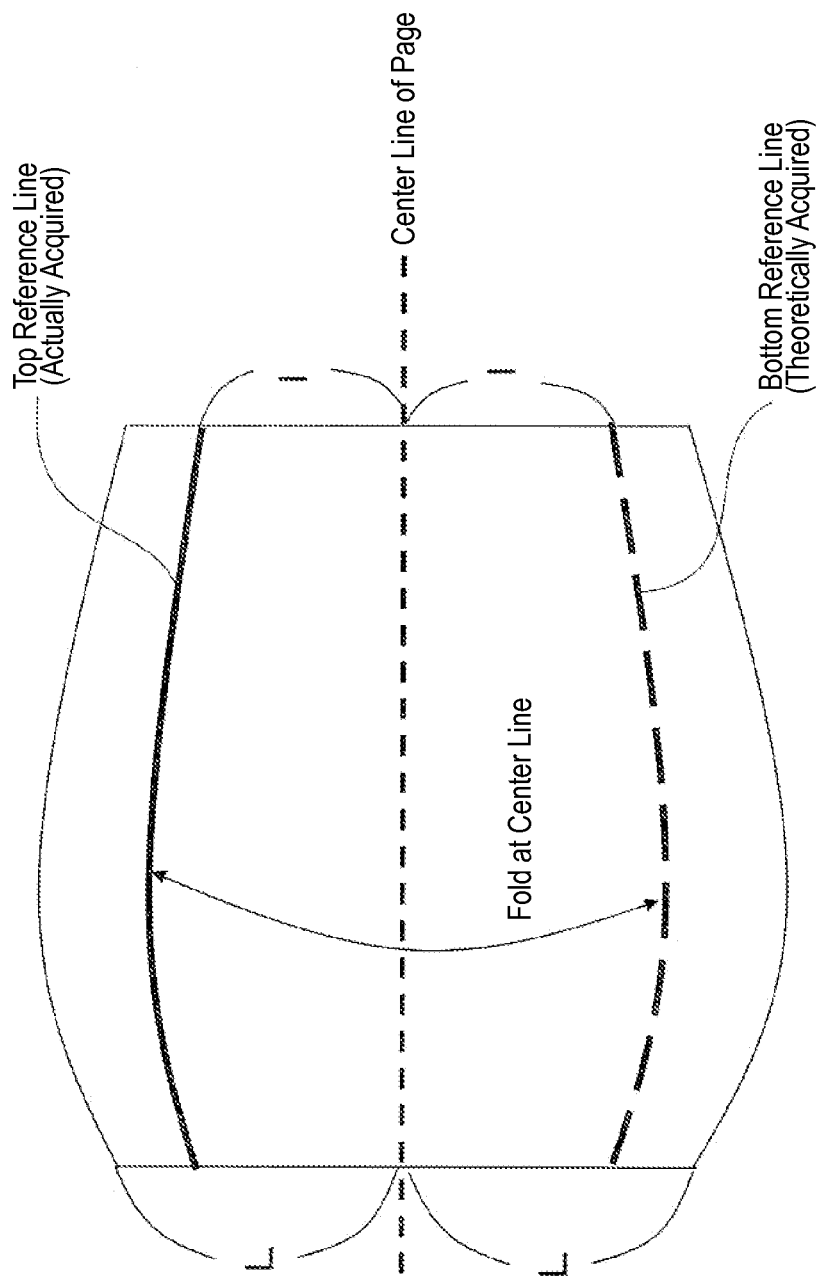
FIG. 28 is a view for explaining reference curves according to Embodiment 2.

Specifically, as shown in FIG. 28, the solid line that extends in the page horizontal direction on the top of FIG. 28 is the to reference line that is actually obtained.

Since the page image is captured in a state in which the position of the camera 6b is approximately in the center of the page, the curve (distortion) of the captured page image is vertically symmetrical about the center line of the page image in the drawing.

Thus, the bottom reference line can be hypothetically obtained as a shape resulting from the obtained top reference line being folded at the center line of the page image.

In this manner, Embodiment 2 makes it possible to reduce the calculation for obtaining the reference curves (the top reference line and bottom reference line).

Embodiment 3

Figure 29:
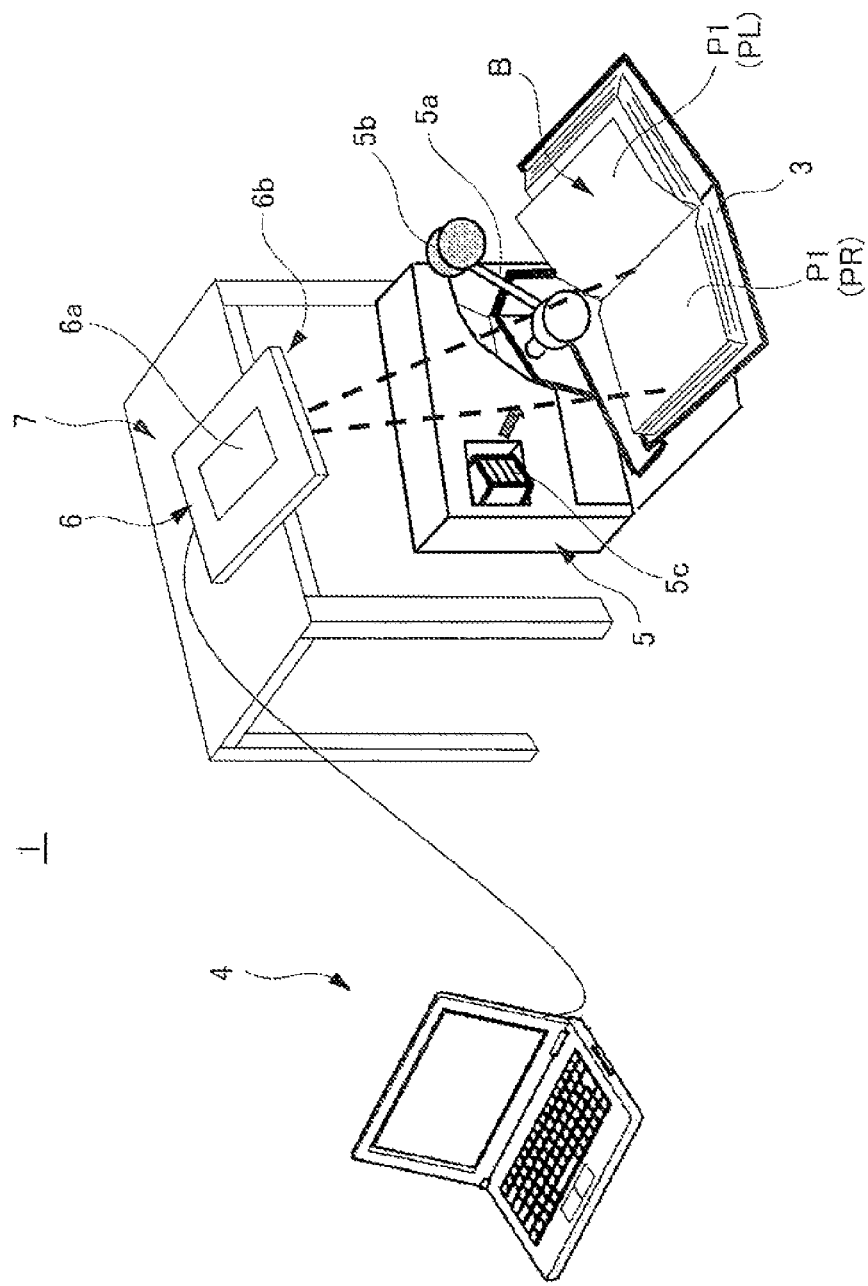
FIG. 29 is a perspective view of a schematic configuration of a document camera system according to Embodiment 3.

FIG. 29 is a view of a configuration in Embodiment 3.

The following primarily explains the differences between Embodiment 2 and Embodiment 3, and overlapping explanations will be omitted.

As shown in FIG. 29, Embodiment 3 differs from Embodiment 2 in that, in a document camera system 1 of Embodiment 3, a camera-equipped tablet 6 is connected to a computer 4.

Figure 30:
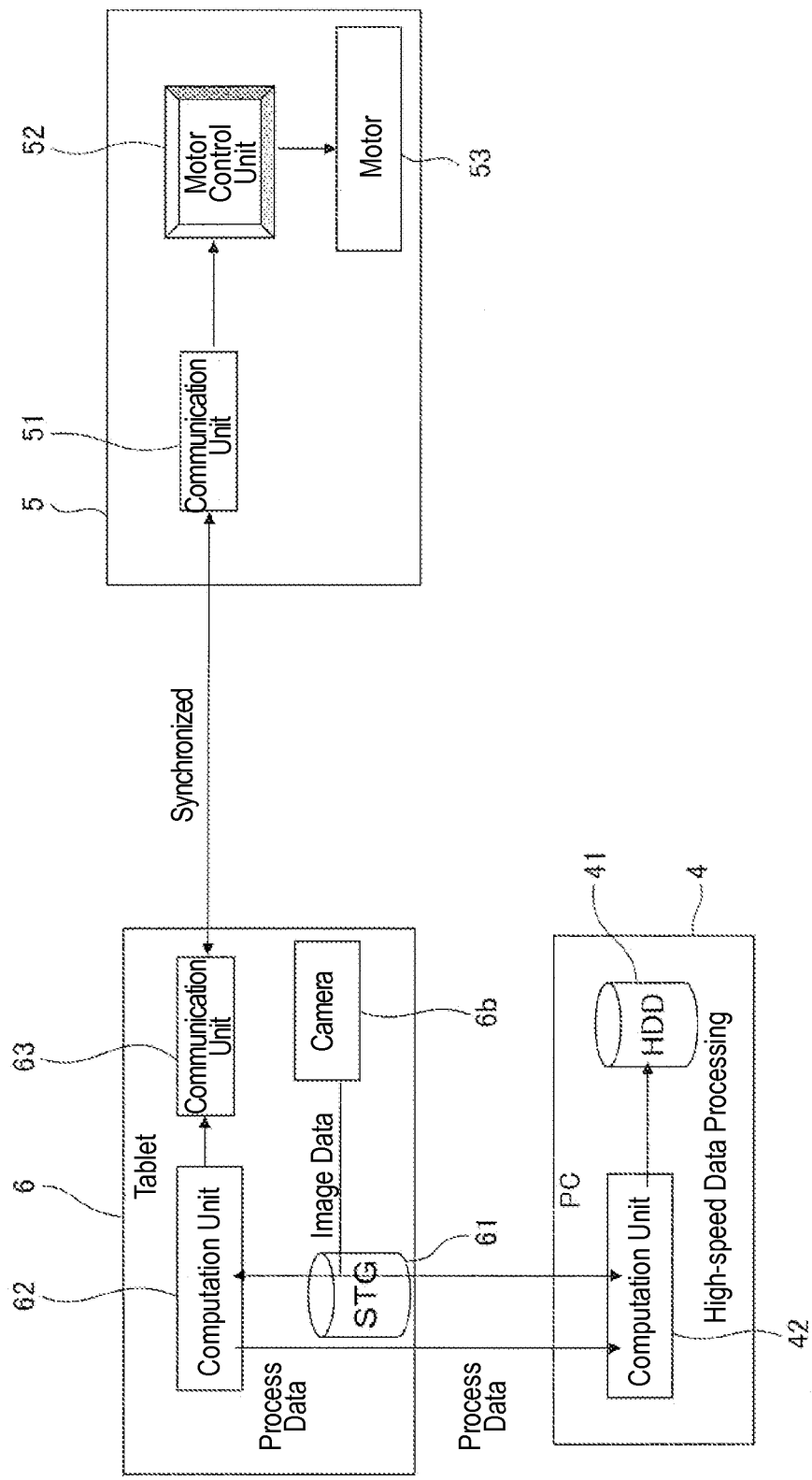
FIG. 30 is a block view of the primary control configuration of the document camera system according to Embodiment 3.

FIG. 30 shows a block diagram of the primary control configuration of the document camera system 1 of Embodiment 3, but as shown in FIG. 30, the computer 4 mainly includes a calculation unit 42 and a storage unit (HDD) 41.

With this type of document camera system 1, the camera-equipped tablet 6 mainly performs an imaging process of page images and the processes in steps 1-4 in FIG. 3. The camera-equipped tablet 6 transmits necessary data to the computer 4, and causes the portions of the processing after step 5 where the amount of calculation becomes heavy to be performed by the computer 4, which is capable of high-speed data processing.

In this manner, in Embodiment 3, it is possible for areas that need to be easy to handle, such as acquisition of reference curves and the like, to be performed by the camera-equipped tablet 6, which has high operability, and for the primary areas of image processing that have heavy calculations to be performed by the computer 4, which is capable of high-speed processing; therefore, it is possible to combine a favorable operability with high-speed image processing.

Specific embodiments of the present invention were described above, but the present invention is not limited to the above embodiments, and modifications, improvements, and the like within the scope of the aims of the present invention are included in the present invention.

It will be apparent to those skilled in the art that various modification and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A page image correction device, comprising:
an acquisition unit that acquires a page image of each page of a plurality of pages from a book, the book being successively imaged in a thickness direction thereof; and
a processor configured to:
derive, in accordance with a page image of a first prescribed page and a page image of a second prescribed page differing from the first prescribed page, an amount of change in a thickness of the book when the book is opened to said first prescribed page as compared to when the book is opened to said second prescribed page; and
correct, in accordance with said amount of change in the thickness of the book, page images of pages between the first prescribed page and the second prescribed page.

2. A page image correction device, comprising:
a page image acquisition unit that acquires a page image of each page of a plurality of pages from a book; and
a processor configured to, with respect to at least some of the plurality of pages from the book:
receive data representing the page image;
acquire a top reference line extending in a page width direction at a top of the page image, and a bottom reference line extending in the page width direction at a bottom of the page image from the received data representing the page image;
determine four reference points on the page image based on said top reference line and said bottom reference line;
correct quadrilateral distortions on the page image using said four reference points as references so that said reference points, after the correction, form a prescribed quadrilateral shape;
virtually divide the page image, the quadrilateral distortions of which have been corrected, into an n-number of substantially rectangular divided regions, the substantially rectangular divided regions extending along a seam direction of the book between a quadrilateral distortion corrected top reference line and a quadrilateral distortion corrected bottom reference line and being arranged in a width direction that is perpendicular to said seam direction;

correct a vertical length in the seam direction of each of the divided regions so that the vertical length of each of the divided regions becomes the same;

estimate an amount of vertical deflection for each of the divided regions, the vertical length of which has been corrected;

correct a horizontal length in the width direction of each of the divided regions on a basis of the amount of the vertical deflection that has been estimated; and combine the n-number of the divided regions, the vertical and horizontal lengths of which have been corrected, thereby creating data representing a combined and corrected page image.

3. The page image correction device according to claim 2, wherein the processor determines two ends of the top reference line and two ends of the bottom reference line as said four reference points, respectively.

4. The page image correction device according to claim 2, wherein the processor estimates the amount of the vertical deflection in accordance with the length in the seam direction of the divided regions.

5. The page image correction device according to claim 4, wherein the processor estimates the amount of the vertical deflection of the respective divided regions using formula $$dz(i) = k \cdot \{H(i) - H(i-1)\},$$

where i is the corresponding divided region, $dz(i)$ is the amount of the vertical deflection of the $i^{th}$ divided region, k is a constant coefficient, $H(i)$ is the length in the seam direction of the $i^{th}$ divided region, and $H(i-1)$ is the length in the seam direction of the $i-1^{th}$ divided region.

6. The page image correction device according to claim 5, wherein k is determined such that an aspect ratio of the combined page image is approximately equal to an aspect ratio of the corresponding page.

7. The page image correction device according to claim 2, wherein the processor combines the n-number of divided regions such that said divided regions are linked in the same arrangement order in the width direction as during division of said divided regions.

8. The page image correction device according to claim 2, wherein the processor corrects the quadrilateral distortions in accordance with a projection matrix that projects the four reference points to four target points that form the prescribed quadrilateral shape.

9. The page image correction device according to claim 8, wherein the processor derives a perturbation amount $\Delta A$ that represents a change in the projection matrix for each single page change in accordance with the projection matrices of two pages that are separated from each other; regards one of said two pages as a reference page; and derives a projection matrix of each page between said two pages by perturbing the projection matrix of the reference page by the perturbation amount $\Delta A$ in an amount corresponding to a number of pages from the reference page.

10. The page image correction device according to claim 9, wherein said two pages are both left pages or are both right pages.

11. The page image correction device according to claim 2, wherein the processor derives a perturbation amount $\Delta UL$ that represents a change in the quadrilateral distortion corrected top reference line for each single page change in accordance with the respective quadrilateral distortion corrected top reference lines of two pages that are separated from each other, wherein the processor derives a perturbation amount $\Delta DL$ that represents a change in the quadrilateral distortion corrected bottom reference line for each single page change in accordance with the respective quadrilateral distortion corrected bottom reference lines of said two pages, wherein the processor regards one of said two pages as a reference page; derives the quadrilateral distortion corrected top reference line of each page between said two pages by perturbing the quadrilateral distortion corrected top reference line of the reference page by the perturbation amount $\Delta UL$ in an amount corresponding to a number of pages from the reference page; and derives the quadrilateral distortion corrected bottom reference line of each page between said two pages by perturbing the quadrilateral distortion corrected bottom reference line of the reference page by the perturbation amount $\Delta DL$ in an amount corresponding to the number of pages from the reference page.

12. The page image correction device according to claim 11, wherein said two pages are both left pages or are both right pages.

13. The page image correction device according to claim 2, wherein the processor locates a line at the top of the page image that is supposed to be a straight line if the page image does not contain any distortion, and determines said line as the top reference line, and wherein the processor locates a line at the bottom of the page image that is supposed to be a straight line if the page image does not contain any distortion, and determines said line as the bottom reference line.

14. The page image correction device according to claim 13, wherein, if a pattern that is a candidate for the top or bottom reference line does not uniquely define a straight line having connected dots, the processor calculates a line having connected dots that go through a center of said pattern.

15. The page image correction device according to claim 13, wherein, if said determined top reference line or said bottom reference line does not reach from one end of a page to another end in a left-right direction, the processor extends said top reference line or said bottom reference line so as to reach from said one end of the page to the other end in the left-right direction.

16. The page image correction device according to claim 2, wherein the processor acquires, as the top reference line or the bottom reference line, a line that is included at the top or bottom of the page image, and wherein the other of the top reference line or bottom reference line is acquired as a line that is symmetric to the acquired top reference line or bottom reference line about a horizontal center line going through substantially a center of the page image.

17. The page image correction device according to claim 2, wherein the processor shifts a position of the quadrilateral distortion corrected top reference line and a position of the quadrilateral distortion corrected bottom reference line, such that an entire section of the page image that needs to be further corrected by the processor is located between the quadrilateral distortion corrected top and bottom reference lines that have been shifted.

18. A non-transitory computer-readable storage medium having stored therein a program executable by a processor that controls a page image correction device, said program causing said processor to perform the following:
- acquire a page image of each page of a plurality of pages from a book, the book being successively imaged in a thickness direction thereof;
- derive, in accordance with a page image of a first prescribed page and a page image of a second prescribed page differing from the first prescribed page, an amount of change in a thickness of the book when the book is opened to said first prescribed page as compared to when the book is opened to said second prescribed page; and
- correct, in accordance with said amount of change in the thickness of the book, page images of pages between the first prescribed page and the second prescribed page.

* * * * *